(12) United States Patent
Hirokawa

(10) Patent No.: US 7,502,688 B2
(45) Date of Patent: *Mar. 10, 2009

(54) SYSTEM FOR AUTONOMOUS VEHICLE NAVIGATION WITH CARRIER PHASE DGPS AND LASER-SCANNER AUGMENTATION

(75) Inventor: Rui Hirokawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/742,972

(22) Filed: May 1, 2007

(65) Prior Publication Data

US 2007/0244640 A1   Oct. 18, 2007

Related U.S. Application Data

(63) Continuation-in-part of application No. 10/986,205, filed on Nov. 12, 2004, now Pat. No. 7,228,230.

(51) Int. Cl.
*G01C 21/00* (2006.01)
(52) U.S. Cl. .............. 701/214; 701/207; 701/213; 342/357.06; 342/358
(58) Field of Classification Search .......... 701/207, 701/213, 214, 216, 220, 221, 300; 342/557.06, 342/558; 340/995.24
See application file for complete search history.

(56) References Cited

U.S. PATENT DOCUMENTS 5,130,934 A * 7/1992 Ikeuchi .................. 700/90
5,490,073 A   2/1996 Kyrtsos
6,047,235 A * 4/2000 Hiyokawa et al. ......... 701/201
6,151,539 A   11/2000 Bergholz et al.

(Continued)

FOREIGN PATENT DOCUMENTS

JP   4-142480   5/1992

(Continued)

OTHER PUBLICATIONS

Rui Hirokawa, et al., Threading the Maze, GPS/INS, Landmark Sensing, and Obstacle Avoidance, GPS World, Nov. 2004, pp. 20-26.

(Continued)

*Primary Examiner*—Jack W. Keith
*Assistant Examiner*—Matthew Lichti
(74) *Attorney, Agent, or Firm*—Oblon, Spivak, McClelland, Maier & Neustadt, P.C.

(57) ABSTRACT

A horizontal navigation system aided by a carrier phase differential Global Positioning System (GPS) receiver and a Laser-Scanner (LS) for an Autonomous Ground Vehicle (AGV). The high accuracy vehicle navigation system is highly demanded for advanced AGVs. Although high positioning accuracy is achievable by a high performance RTK-GPS receiver, the performance should be considerably degraded in a high-blockage environment due to tall buildings and other obstacles. The present navigation system is to provide decimeter-level positioning accuracy in such a severe environment for precise GPS positioning. The horizontal navigation system is composed of a low cost Fiber Optic Gyro (FOG) and a precise odometer. The navigation errors are estimated using a tightly coupled Extended Kalman Filter (EKF). The measurements of the EKF are double differenced code and carrier phase from a dual frequency GPS receiver and relative positions derived from laser scanner measurements.

16 Claims, 22 Drawing Sheets

U.S. PATENT DOCUMENTS

| | | | |
|---|---|---|---|
| 6,269,306 | B1 | 7/2001 | Ibrahim et al. |
| 6,282,496 | B1 | 8/2001 | Chowdhary |
| 6,520,448 | B1 | 2/2003 | Doty et al. |
| 6,694,260 | B1 | 2/2004 | Rekow |
| 7,110,880 | B2 | 9/2006 | Breed et al. |
| 2002/0120400 | A1* | 8/2002 | Lin .............................. 701/214 |
| 2003/0135327 | A1 | 7/2003 | Levine |
| 2005/0137799 | A1 | 6/2005 | Alban et al. |
| 2005/0212697 | A1 | 9/2005 | Brabec et al. |
| 2005/0264445 | A1 | 12/2005 | Brabec et al. |

FOREIGN PATENT DOCUMENTS

| | | |
|---|---|---|
| JP | 4-366713 | 12/1992 |
| JP | 7-5241 | 1/1995 |
| JP | 7-301541 | 11/1995 |
| JP | 8-68654 | 3/1996 |
| JP | 8-68655 | 3/1996 |
| JP | 9-507581 | 7/1997 |
| JP | 11-212640 | 8/1999 |
| JP | 2000-55678 | 2/2000 |
| JP | 2000-284830 | 10/2000 |
| JP | 2001-66358 | 3/2001 |
| JP | 2005-195395 | 7/2005 |
| JP | 2005-283576 | 10/2005 |

OTHER PUBLICATIONS

Paul de Jonge, et al., "The LAMBDA method for integer ambiguity estimation: Implementation aspects", LGR-Series, Publications of the Delft Geodetic Computing Centre, No. 12, Aug. 1996, 5 cover pages and pp. 1, 3-5, 7-17, 19-37, 39, 41, 43, 45-49.

Rui Hirokawa, et al., "Design and Evaluation of A Tightly Coupled GPS/INS using Low Cost MEMS IMU", GNSS Symposium 2003, Nov. 2003, pp. 647-653.

Tetsuro Imakiiere, et al., "Geonet: Nationwide GPS array of Japan", GIS Development, vol. 8, No. 3, Mar. 2004, 8 pages.

Jun-ichi Takiguchi, et al., "A Study of Autonomous Mobile System in Outdoor Environment (Part 3 Local Path Planning for a Nonholonomic)", IEEE International Voice Electronics Conference, Sep. 1999, pp. 485-490.

K. Ohno, et al., "Outdoor Navigation of a Mobile Robot between Buildings based on DGPS and Odometry Data Fusion", IEEE International Conference on Robotics and Automation, vol. 2, Sep. 14-19, 2003, pp. 1978-1984.

Sachin Modi, et al., "Comparison of three obstacle avoidance methods for an autonomous guided vehicle", Master's thesis, University of Cincinnati, 2002, 3 cover pages and pp. 1-49.

P. J. G. Teunissen, "The Least-squares ambiguity decorrelation adjustment: a method for fast GPS integer ambiguity estimation", Journal of Geodesy, vol. 70, No. 1, 1995, pp. 65-82.

Robert M. Rogers, "Applied Mathematics in Integrated Navigation Systems", AIAA Education Series, Second Edition, Oct. 2003, 2 cover pages and pp. 267-277.

Salah Sukkarieh, et al., "A High Integrity IMU/GPS Navigation Loop for Autonomous Land Vehicle Applications", IEEE Transactions on Robotics and Automation, vol. 15, No. 3, Jun. 1999, pp. 572-578.

Paul de Jonge, et al., "Integer Ambiguity Estimation with the LAMBDA method", Proceedings IAG Symposium 'GPS trends in terrestrial, airborne and spaceborne applications'. XXI General Assembly of IUGG, Jul. 2-14, 1995, pp. 1-5.

S. Scott-Young, et al., "An augmented reality intelligent navigation aid for land applications", Global Positioning Systems Society Inc., Jul. 22-25, 2003, 15 pages.

* cited by examiner

SYSTEM FOR AUTONOMOUS VEHICLE NAVIGATION WITH CARRIER PHASE DGPS AND LASER-SCANNER AUGMENTATION

CROSS-REFERENCE TO RELATED APPLICATIONS

The present application is a continuation-in-part application of application Ser. No. 10/986,205, filed Nov. 12, 2004, the entire contents of which are incorporated herein by reference.

BACKGROUND OF THE INVENTION

Field of the Invention

The present invention relates generally to navigational systems using inertial and satellite-based navigation.

The present invention includes the use of various technologies referenced and described in the documents identified in the following LIST OF REFERENCES, which are cited throughout the specification by the corresponding reference number in brackets:

LIST OF REFERENCES

[1] Paul de Jonge and Christian Tiberius. The LAMBDA method for integer ambiguity estimation: implementation aspects. LGR-Series 12, Delft University of Technology, August 1996.

[2] Rui Hirokawa, Koichi Sato, and Kenji Nakakuki. Design and evaluation of a tightly coupled GPS/INS using low cost MEMS IMU. In GNSS Symposium 2003, Tokyo, Japan, November 2003.

[3] Tetsuro Imakiiere, Yuki Hatanaka, Yohta Kumaki, and Atsusi Yamagiwa. Geonet: Nationwide GPS array of Japan. GIS development, 8(3), March 2004.

[4] J. Takiguchi and J. Hallam. A study of autonomous mobile system in outdoor environment (part3 local path planning for a nonholonommic mobile robot by chain form). In IEEE International Vehicle Electronics Conference, Changchun, China, September 1999.

[5] K. Ohno and T. Tsubouchi. Outdoor navigation of a mobile robot between buildings based on dgps and odometry data fusion. In IEEE International Conference on Robotics and Automation, volume 2, pages 1978-1984, 2003.

[6] Sachin Modi. Comparison of three obstacle avoidance methods for an autonomous guided vehicle. Master's thesis, University of Cincinnati, 2002.

[7] P. J. G. Teunissen. The least-squares ambiguity decorrelation adjustment: A method for fast GPS integer ambiguity estimation. Journal of Geodesy, 70(1), 1995.

[8] Robert M. Rogers. Applied Mathematics in Integrated Navigation Systems. AIAA Education Series. AIAA, second edition edition, October 2003.

[9] S. Sukkarieh and E. Nebot. A high integrity IMU/GPS navigation loop for autonomous land vehicle application. IEEE Trans. on Robotics and Automation, 15(3):572-578, June 1999.

The entire contents of each reference in the above LIST OF REFERENCES is incorporated herein by reference.

DISCUSSION OF THE BACKGROUND

Developing an outdoor navigation system that enables a vehicle to go through many obstacles is a major challenge for autonomous ground vehicles with GPS receivers [4, 6]. Navigation systems integrating low-cost inertial sensors and high performance GPS receivers will be applied in wide variety of mobile systems. The navigation system based on IMU or odometry coupled with GPS is widely used [9, 5]. However, performance is considerably degraded in a high-blockage environment due to tall buildings and other obstacles. A tightly coupled GPS/INS [2] has several advantages over a loosely coupled system such as better blunder detection of GPS pseudorange and higher positioning accuracy, especially under poor satellite visibility.

SUMMARY OF THE INVENTION

According to an aspect of the present invention, there is provided a navigational device for determining the position and the heading of an object, comprising a navigation calculation device configured to calculate the position and the heading of the object based on an output of a velocity detecting device and an output of a yaw rate detecting device; and an estimator configured to estimate, based on a carrier phase and a pseudorange received from a global positioning satellite, (1) an error of the velocity detecting device, (2) an error of the yaw rate detecting device, (3) a position error and a heading error of the object, and (4) an integer-valued bias of a carrier, wherein the navigation calculation device is configured to update the position and the heading of the object based on the position error and the heading error estimated by the estimator.

In addition, an embodiment of the present invention is a terrestrial vehicle having embedded therein the navigational device described above.

Further, according to another aspect of the present invention, there is provided a navigational method of determining a position and heading of an object, comprising: calculating the position and the heading of the object based on an output of a velocity detecting device and an output of a yaw rate detecting device; estimating, based on a carrier phase and a pseudorange received from a global positioning satellite, (1) an error of the velocity detecting device, (2) an error of the yaw rate detecting device, (3) a position error and a heading error of the object, and (4) an integer-valued bias of a carrier; and updating the position and the heading of the object based on the estimated position error and the estimated heading error.

In another embodiment of the present invention, there is provided, a navigational system for determining a position and heading of a vehicle using inertial and satellite navigation, comprising: (1) a velocity detecting device configured to detect a velocity of the vehicle; (2) a yaw rate detecting device configured to detect a yaw rate of the vehicle; (3) a landmark database configured to store position data of a known landmark; (4) a range measuring device attached to the vehicle, the range measuring device configured to measure a range from the vehicle to the known landmark; (5) a navigation calculation device configured to calculate the position and the heading of the autonomous vehicle based on the velocity detected by the velocity detecting device and the yaw rate detected by the yaw rate detecting device; and (6) an estimator configured to estimate, based on a carrier phase and a pseudorange received from a global positioning satellite, an error of the velocity detecting device, an error of the yaw rate detecting device, a position error and a heading error of the object, and an integer-valued bias of a carrier, wherein the navigation calculation device is configured to update the position and the heading of the object based on the position error and the heading error estimated by the estimator.

In addition, another embodiment of the present invention is a terrestrial vehicle equipped with the navigation system of described above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
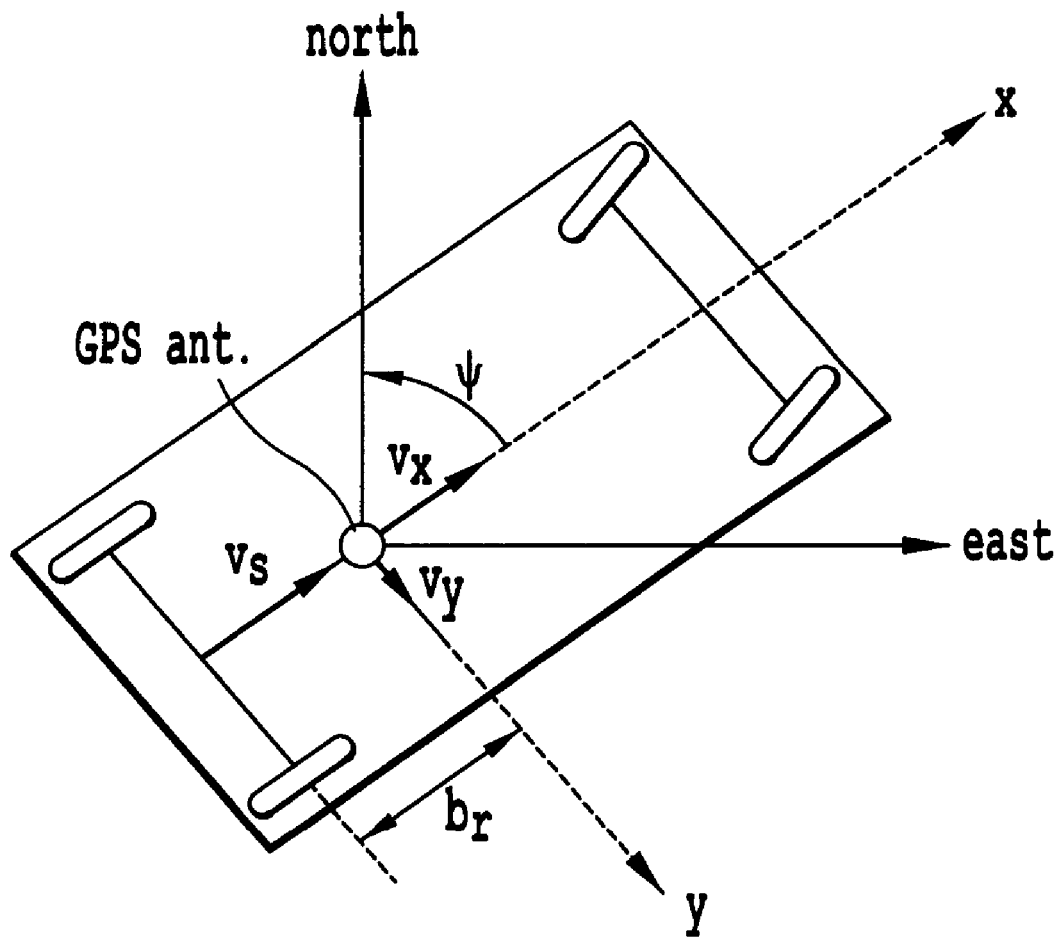
FIG. 1 illustrates a dynamical model of a terrestrial vehicle.

The navigation system consists of horizontal strapdown navigation calculation and the extended Kalman filter (EKF). FIG. 1 shows a horizontal dynamics model of the vehicle. The strapdown calculation in a local horizontal frame is performed by position and heading (yaw angle) updates using rate gyro, e.g., a low-cost Fiber Optic Gyro (FOG), and the odometer input compensated by the EKF. A Micro Electro Mechanical Systems (MEMS) gyro and a vibrating gyro may also be used. The position of the vehicle is defined as the phase center of a GPS antenna, and the position dynamics in local NED (North-East-Down) frame is defined as follows, $$\begin{bmatrix} \dot{N} \\ \dot{E} \end{bmatrix} = R(\psi) \begin{bmatrix} v_x \\ v_y \end{bmatrix}; \dot{D} = 0 \tag{1}$$

$$R(\psi) = \begin{bmatrix} \cos\psi & -\sin\psi \\ \sin\psi & \cos\psi \end{bmatrix} \tag{2}$$

where $v_x$ and $v_y$ are the body-frame velocity defined as follows, $$\begin{bmatrix} v_x \\ v_y \end{bmatrix} = \begin{bmatrix} V_s \\ b_r r_s \end{bmatrix}. \tag{3}$$

$V_s$ and $r_s$ are the compensated velocity measured by the odometer and the yaw rate measured by FOG, respectively. $b_r$ is the horizontal distance between the rear wheel axis and the GPS antenna phase center.

The compensated velocity and yaw rate are calculated by, $$V_s = \frac{1}{1+e_{od}} V_{od} \tag{4}$$

$$r_s = \frac{1}{1+e_g}(r - b_g) \tag{5}$$

where $V_{od}$ is the odometer velocity, r is the yaw rate, $e_{od}$ is the odometer scale factor error, $e_g$ is the gyro scale factor error, and $b_g$ is the gyro bias error. The heading dynamics are modeled by, $$\frac{d}{dt}\psi = r_s \tag{6}$$

The strapdown calculation is performed based on the integration of equations (1)-(6). Note that the velocity and yaw rate used in equations (1)-(6) may be uncompensated or compensated by the sensor error signal estimated by the Kalman filter, as shown in FIG. 2.

The EKF estimates states x=[p s a] consisting of position errors p=[n e d]$^T$ (north, east, down), sensor errors s (heading error $\epsilon$, odometer scale factor error $e_v$, gyro scale factor $e_g$, gyro bias $b_g$) and a float ambiguity vector α of double differenced (DD) carrier phase. The order of states depends on the number of tracked satellites. For a 12 channel dual frequency receiver, it is no more than 29 states.

Figure 2:
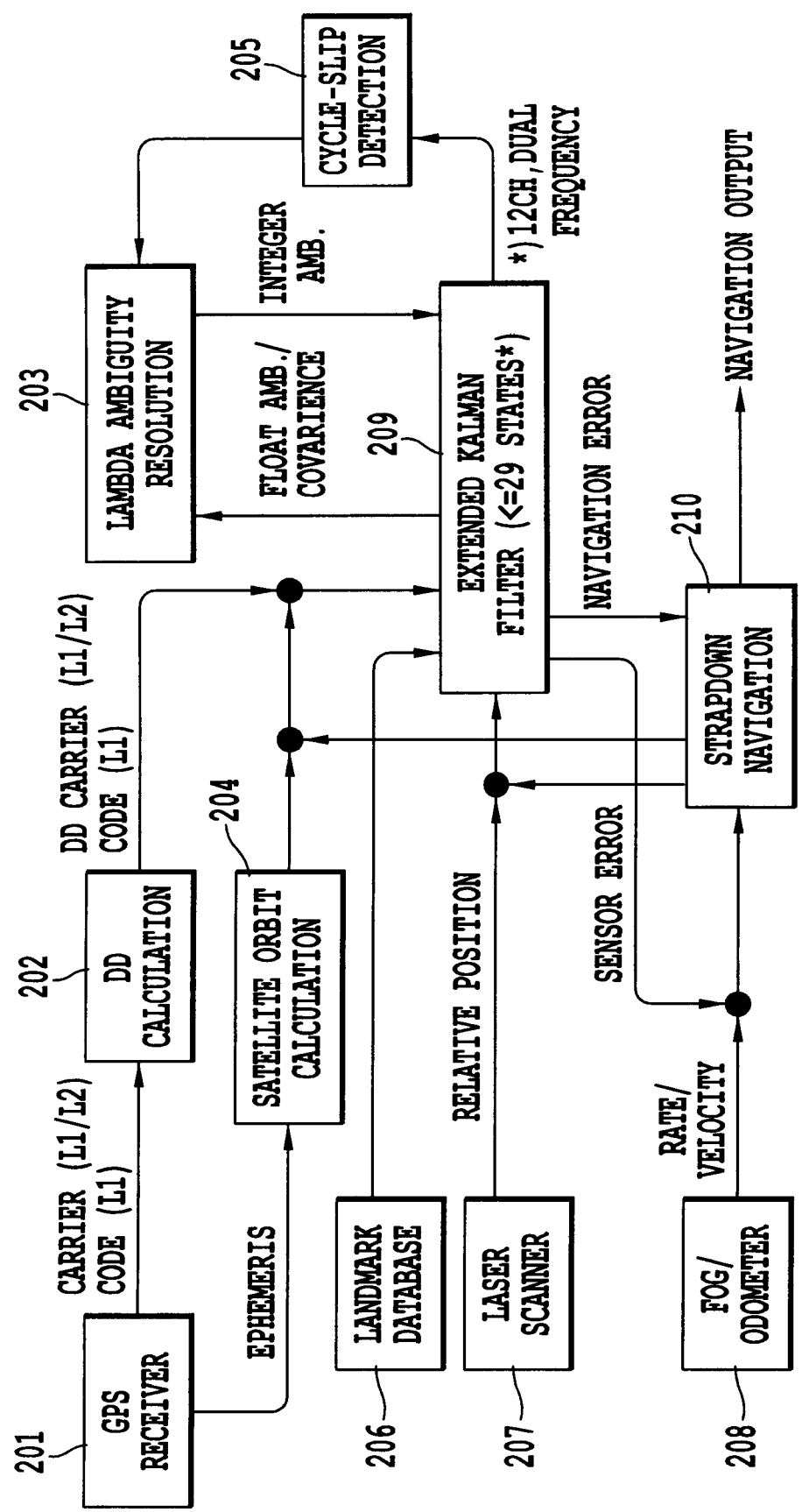
FIG. 2 illustrates a GPS/DR navigation system according to an embodiment of the present invention.

FIG. 2 shows a block diagram of a navigation system, including the EKF 209, according to an embodiment of the present invention. The FOG/odometer sensors 208 provide the yaw rate and the velocity to the strapdown navigation unit 210. A laser scanner 207 provides relative position information to the EKF 209. As described below, the landmark database 206 provides geometric data of at least one known landmark. Landmarks used in embodiments of the present invention include a traffic sign, a curbstone, and white lines. The GPS receiver 201, the DD calculation unit 202, and the satellite orbit calculation unit 204 provide the satellite navigation information to the EKF 209. As discussed in more detail below, the LAMBDA ambiguity resolution unit 203 and the cycle-slip detection unit 205 resolve ambiguity in the integer-valued bias of the carrier.

The Kalman filter 209 is implemented in feedback form so that the error in strapdown navigation unit 210 and that of sensor inputs can be compensated. The dynamics of the states x are represented by the linear differential equation, $$\frac{d}{dt}x = Fx + w \qquad (7)$$

where F is the system matrix and w is the process noise vector.

The system matrix F is derived from the system error dynamics, which are represented by the equations shown below, $$\begin{bmatrix} \dot{n} \\ \dot{e} \end{bmatrix} = \frac{\partial R(\psi)}{\partial \psi} \begin{bmatrix} v_x \\ v_y \end{bmatrix} \in +R(\psi) \begin{bmatrix} v_x e_v \\ v_y e_g \end{bmatrix} + b_r \begin{bmatrix} -\sin\psi \\ \cos\psi \end{bmatrix} b_g + w \qquad (8)$$

$$\dot{\in} = re_g + b_g + w \qquad (9)$$

$$\dot{b}_g = \frac{-1}{\tau_g} b_g + w \qquad (10)$$

where $\tau_g$ is the correlation time of the gyro bias.

The error dynamics of other states including the altitude, float ambiguities, and sensor inputs are formulated as random-walk process models.

$$\dot{X}_i = w_i \qquad (11)$$

The dynamics of the Kalman filter are represented in discrete form. The transition matrix of the system $\Phi$ is calculated by, $$\Phi_k = I + \tau F + \frac{\tau^2}{2} F^2 \qquad (12)$$

where $\tau$ is the sampling time.

The Kalman filter calculation consists of the time propagation and the measurement update. The time propagation for covariance matrix P is defined as, $$P_{k+1}^- = \Phi_k P_k^+ \Phi_k^T + Q_d \qquad (13)$$

where $Q_d$ is the process noise matrix.

The measurement update of the EKF is defines as, $$K = P_k^- H^T (H P_k^- H^T + R)^{-1} \qquad (14)$$

$$P_k^+ = (I - KH) P_k^- \qquad (15)$$

$$X_k = K\Delta z \qquad (16)$$

where H is measurement matrix, K is Kalman gain matrix, R is measurement noise matrix, and $\Delta z$ is the measurement residual.

The position, heading angle, sensor errors, and the float ambiguities are updated by as follows, $$\begin{bmatrix} N \\ E \\ D \\ \psi \\ e_{od} \\ e_g \\ b_g \\ \alpha_{11} \\ \vdots \\ \alpha_{1m} \\ \alpha_{21} \\ \vdots \\ \alpha_{2m} \end{bmatrix} = \begin{bmatrix} N \\ E \\ D \\ \psi \\ e_{od} \\ e_g \\ b_g \\ \alpha_{11} \\ \vdots \\ \alpha_{1m} \\ \alpha_{21} \\ \vdots \\ \alpha_{2m} \end{bmatrix}_k + \begin{bmatrix} x_1 \\ x_2 \\ x_3 \\ x_4 \\ x_5 \\ x_6 \\ x_7 \\ x_8 \\ \vdots \\ x_{7+m} \\ x_{8+m} \\ \vdots \\ x_{7+2m} \end{bmatrix}_k \qquad (17)$$

where m is the number of observed satellites minus one.

The two different measurements, the DD range by GPS, and the relative range by the laser-scanner are used. The measurement matrix H and the measurement residual $\Delta z$ are defined as shown below. The dual-frequency DD carrier phases and code phases are used as measurements of the filter.

After an integer ambiguity is obtained successfully, the order of EKF is decreased to be seven, and only the ambiguity resolved dual-frequency double differenced (DD) carrier phase are used as measurement.

The measurement matrix H of EKF is defined as, $$H = \begin{bmatrix} AC_n^e & 0_{m\times 4} & 0_{m\times m} & 0_{m\times m} \\ AC_n^e & 0_{m\times 4} & \lambda_1 I_m & 0_{m\times m} \\ AC_n^e & 0_{m\times 4} & 0_{m\times m} & \lambda_2 I_m \end{bmatrix} \qquad (18)$$

where $C_n^e$ is the direction cosine matrix between the local horizontal frame and the ECEF frame, A is the geometric projection matrix for each satellite, $\lambda_1, \lambda_2$ are the wave length of GPS L1 and L2, respectively.

The measurement matrix R for the GPS measurement update is highly correlated because it is based on DD observations. The measurement residual $\Delta z$ is defined as, $$\Delta z = \begin{bmatrix} \Delta\rho_c - \Delta\rho_{C1} \\ \Delta\rho_c - \Delta\rho_{L1} - \lambda_1 a_1 \\ \Delta\rho_c - \Delta\rho_{L2} - \lambda_2 a_2 \end{bmatrix} \qquad (19)$$

where $\Delta\pi_c$ is the DD geometric range, $\Delta\pi_{c1}$, $\Delta\pi_{L1}$ and $\Delta\pi_{L2}$ are the measured DD code and carrier phase, and $\alpha_1$ and $\alpha_2$ are the DD ambiguities for L1 and L2.

After the integer ambiguities are resolved successfully, the DD carrier phase measurements are used with the resolved integer ambiguities $\alpha$.

$$\Delta z = \begin{bmatrix} \Delta\rho_c - \Delta\rho_{L1} - \lambda_1 \breve{a}_1 \\ \Delta\rho_c - \Delta\rho_{L2} - \lambda_1 \breve{a}_2 \end{bmatrix} \qquad (20)$$

The relative position measured by a laser scanner is also used as an additional measurement to compensate position and heading error. The corner landmark, which has a known position stored in the landmark position database, is used to estimate the error by measuring the relative position between the landmark and the laser scanner sensor.

Figure 3:
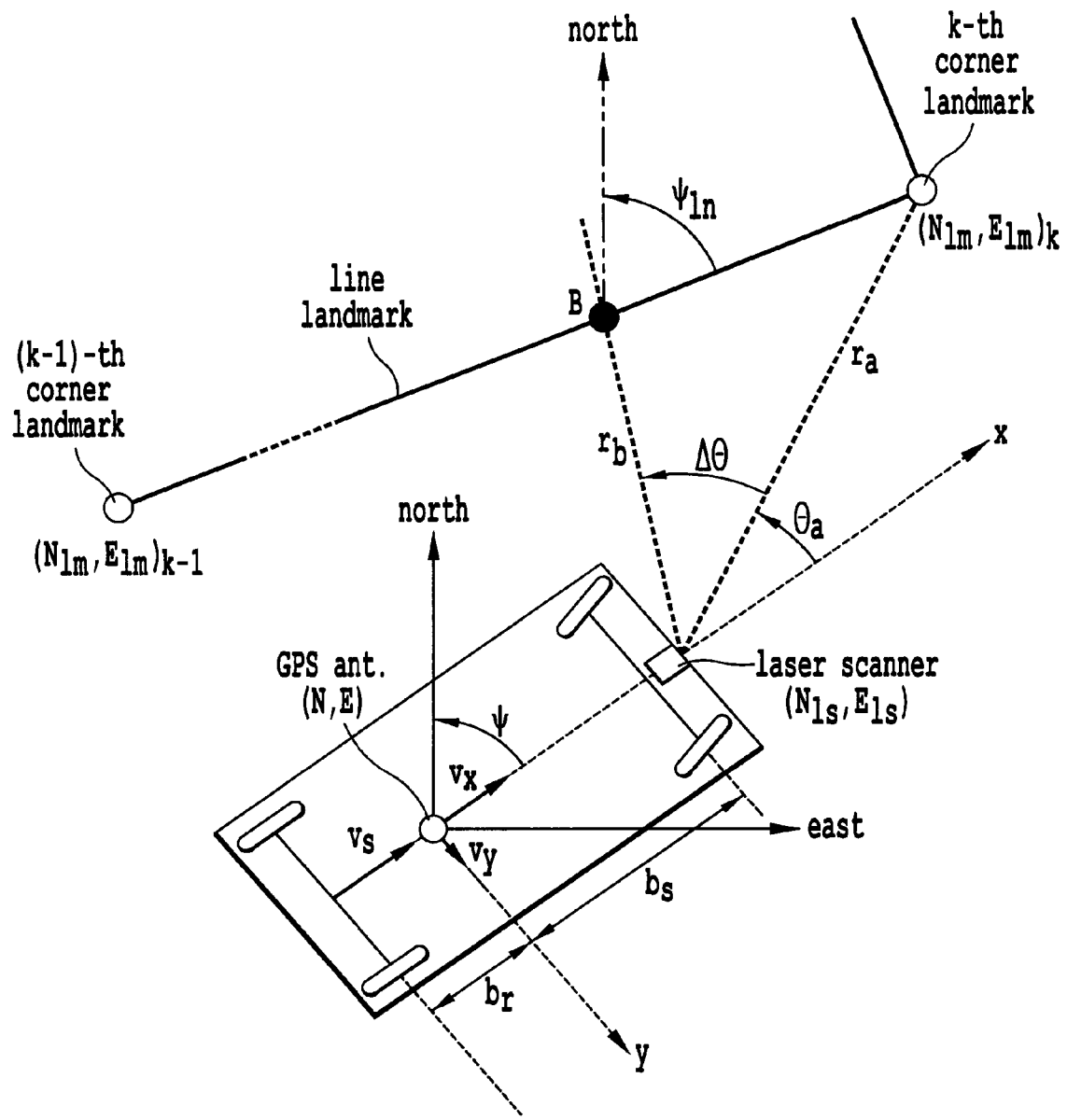
FIG. 3 illustrates a landmark update.

The line landmark is composed by connecting the two successive corner landmarks. The relative range between the line landmark and the scanner can also be measured. The relative position cannot be measured for the line landmark, but the relative angle can be measured. The corner landmark update combining the line landmark is used for computational efficiency. FIG. 3 shows the definition of the landmark update.

The range $r_a$ between the corner landmark and the laser scanner is measured by the laser scanner. The position of the corner landmark can be detected by the discontinuity of the range. The direction in the body frame $\theta_a$ is also measured by the sensor. In another embodiment, the angle $\theta_a$ between the vehicle body frame and the landmark can be obtained from an image sensor, rather than the laser scanner. The range vector between the laser scanner and the corner landmark represented in the body frame and the navigation frame are defined as, $$r_a^b = \bar{r}_a \begin{bmatrix} \cos\theta_a \\ \sin\theta_a \end{bmatrix} \equiv \begin{bmatrix} r_{ax}^b \\ r_{ay}^b \end{bmatrix} \tag{21}$$

$$r_a^n = r_a \begin{bmatrix} \cos(\theta_a + \psi) \\ \sin(\theta_a + \psi) \end{bmatrix} \equiv \begin{bmatrix} r_{ax}^n \\ r_{ay}^n \end{bmatrix} \tag{22}$$

The position of the sensor is calculated by the vehicle position and the heading.

$$\bar{p}_{ls} = \begin{bmatrix} N \\ E \end{bmatrix} + b_s \begin{bmatrix} \cos\psi \\ \sin\psi \end{bmatrix} \equiv \begin{bmatrix} N_{ls} \\ E_{ls} \end{bmatrix} \tag{23}$$

where $b_s$ is the distance between the GPS antenna and the laser scanner.

The relative range $r_c$ and the direction in the body frame $\theta_c$ are calculated by, $$r_c = \sqrt{(N_{lm,k} - N_{ls}^2) + (E_{lm,k} - E_{ls})^2} \tag{24}$$

$$\theta_c = \tan^{-1}\left(\frac{N_{lm,k} - N_{ls}}{E_{lm,k} - E_{ls}}\right) - \psi \tag{25}$$

where $(N_{lm,k}; E_{lm,k})$ is the horizontal position of the k-th corner landmark.

The other ranging measurement $r_b$ indicated in FIG. 3 is used to define the relative angle of the line-landmark. The direction of the range vector $\bar{r}_b$ is defined as the direction of the corner landmark added by the given offset angle $\Delta\theta$. The reference point B shown in FIG. 3 is defined as the crossover point of the range vector $\bar{r}_b$ and the line landmark.

The range vector $\bar{r}_b$ in the body frame is defined as, $$r_b^b = r_b \begin{bmatrix} \cos(\theta_a + \Delta\theta) \\ \sin(\theta_a + \Delta\theta) \end{bmatrix} \equiv \begin{bmatrix} r_{bx}^b \\ r_{by}^b \end{bmatrix} \tag{26}$$

The heading angle of the line landmark $\Psi_{ln}$ is calculated by adding the corner landmark direction $\theta_s$ and the known angle $\Delta\theta$.

$$\hat{\psi}_{ln} = \tan^{-1}\left(\frac{r_b\sin(\theta_a + \Delta\theta) - r_a\sin\theta_a}{r_b\cos(\theta_a + \Delta\theta) - r_a\cos\theta_a}\right) + \psi \tag{27}$$

$\Delta\theta$ is preferably defined as 30 deg.

The measurement residual $\Delta_z$ is defined as, $$\Delta z = \begin{bmatrix} \hat{r}_a - r_c \\ \hat{\theta} - \theta_c \\ \hat{\psi}_{ln} - \psi_c \end{bmatrix} \tag{28}$$

where $\psi_c$ is the heading angle of the line landmark retrieved from the landmark database. When only the angle is measured by an angle measuring device, such as an image sensor, the measurement residual becomes $\Delta z = \hat{\theta}_a - \theta_c$.

The measurement matrix H is defined as, $$H = \begin{bmatrix} -\frac{r_{anx}}{r_a} & -\frac{r_{any}}{r_a} & 0 & -\frac{r_{aby}b_s}{r_a} & 0_{1\times(3+2m)} \\ \frac{r_{any}}{r_a^2} & -\frac{r_{anx}}{r_a^2} & 0 & -\frac{r_{abx}b_s}{r_a^2} & 0_{1\times(3+2m)} \\ 0 & 0 & 0 & -1 & 0_{1\times(3+2m)} \end{bmatrix} \tag{29}$$

When only the angle is measured by an angle measuring device, the measurement matrix is reduced to the middle row of the matrix H shown above in equation (29).

The integer ambiguities vector ă is resolved by the LAMBDA method [7, 1]. In the LAMBDA method, the integer least square problem shown below is solved, and the two best candidates of the integer ambiguities sets can be obtained.

$$\hat{a} = \underset{a \in Z^n}{\arg\min}(\hat{a} - a)^T Q_{\hat{a}}^{-1}(\hat{a} - a) \tag{30}$$

where $Q_{\hat{a}}$ is the covariance of the float ambiguities, which is estimated by the EKF described above. $Q_{\hat{a}}$ is highly correlated because of the double differencing of ambiguities. Therefore, a direct search is ineffective. In the LAMBDA method, the de-correlation called Z-Transformation is performed before the ambiguity search. The search process can be considerably improved by the de-correlation process.

The integer ambiguities having the least square norm are verified using the ratio test and the residual test. The threshold level of the ratio test is defined as a function of the number of measurements and the confidence level. The 99% confidence level of the F-distribution is preferred.

Figure 20:
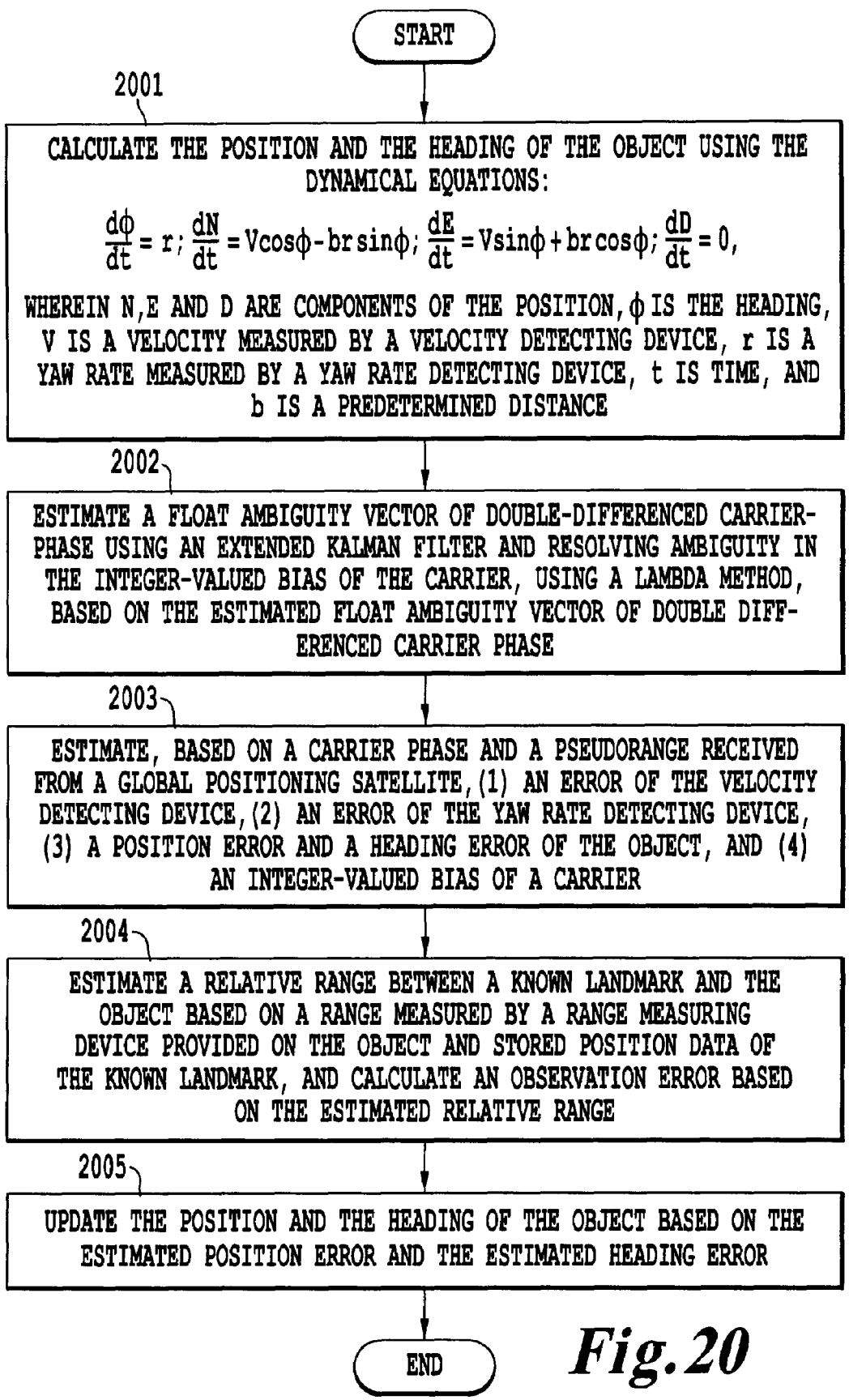
FIG. 20 illustrates a method according to an embodiment of the present invention.

FIG. 20 illustrates a method of determining a position and heading of an object according to an embodiment of the present invention. In step 2001, the position and the heading of the object is calculated using the dynamical equations:

$$\frac{d\phi}{dt} = r;$$

$$\frac{dN}{dt} = V\cos\phi - br\sin\phi;$$

$$\frac{dE}{dt} = V\sin\phi + br\cos\phi;$$

$$\frac{dD}{dt} = 0,$$

wherein N, E, and D are components of the position, φ is the heading, V is a velocity measured by the velocity detecting device, r is a yaw rate measured by the yaw rate detecting device, t is time, and b is a predetermined distance. Next, in step 2002, a float ambiguity vector of double-differenced carrier phase is estimated using the extended Kalman filter and ambiguity in the integer-valued bias of the carrier is resolved using a Lambda method, based on the estimated float ambiguity vector of double-differenced carrier phase. In step 3003, based on a carrier phase and a pseudorange received from the global positioning satellite, the following values are estimated: (1) an error of the velocity detecting device, (2) an error of the yaw rate detecting device, (3) a position error and a heading error of the object, and (4) an integer-valued bias of a carrier. In step 2004, a relative range between a known landmark and the object is estimated based on a range measured by a range measuring device provided on the object and stored position data of the known landmark. In addition, the observation error is estimated based on the estimated relative range. Finally, in step 2005, the position and the heading of the object is updated based on the estimated position error and the estimated heading error.

Simulation

Figure 4:
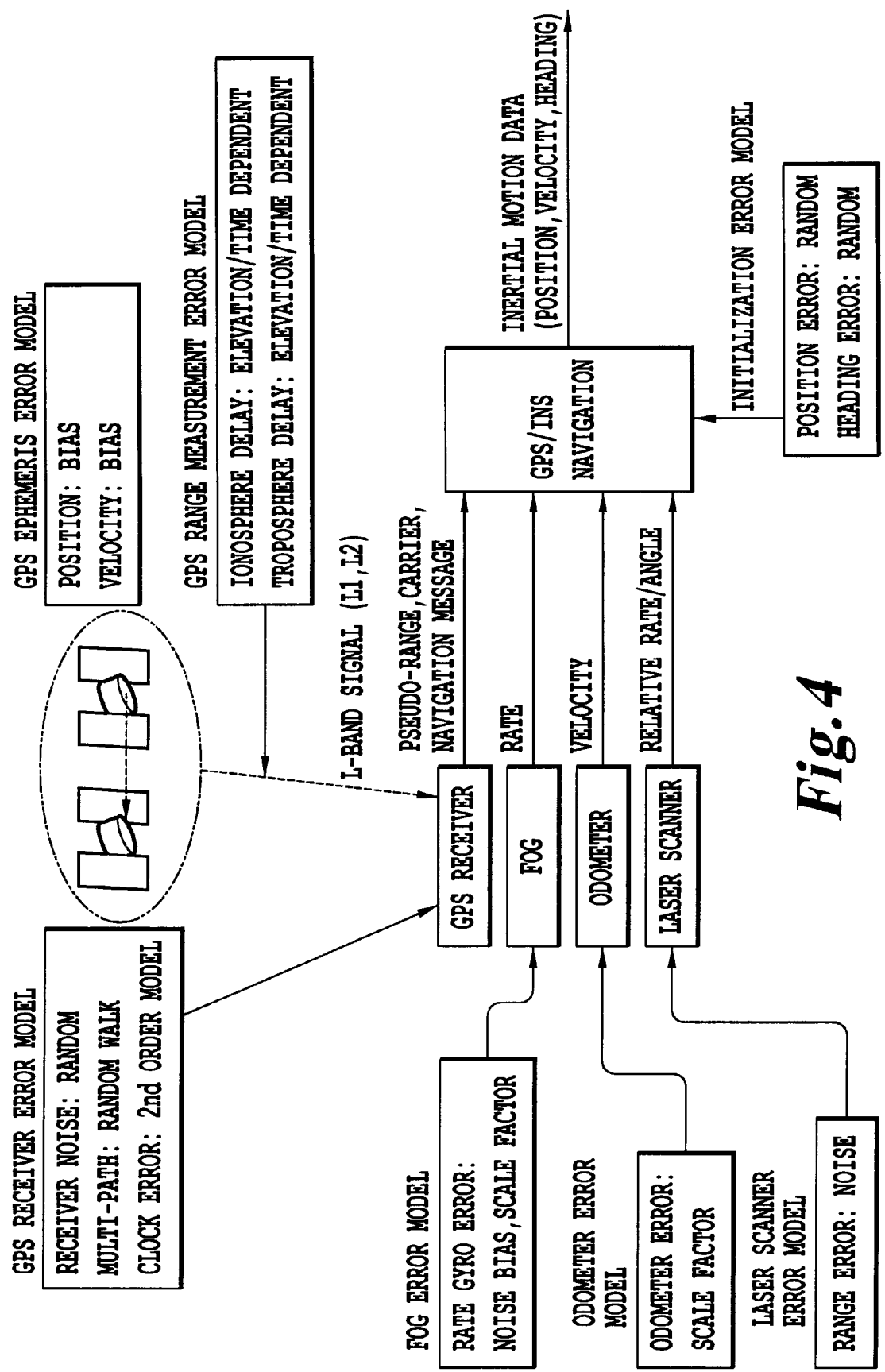
FIG. 4 illustrates a GPS simulation model.
Figure 5:
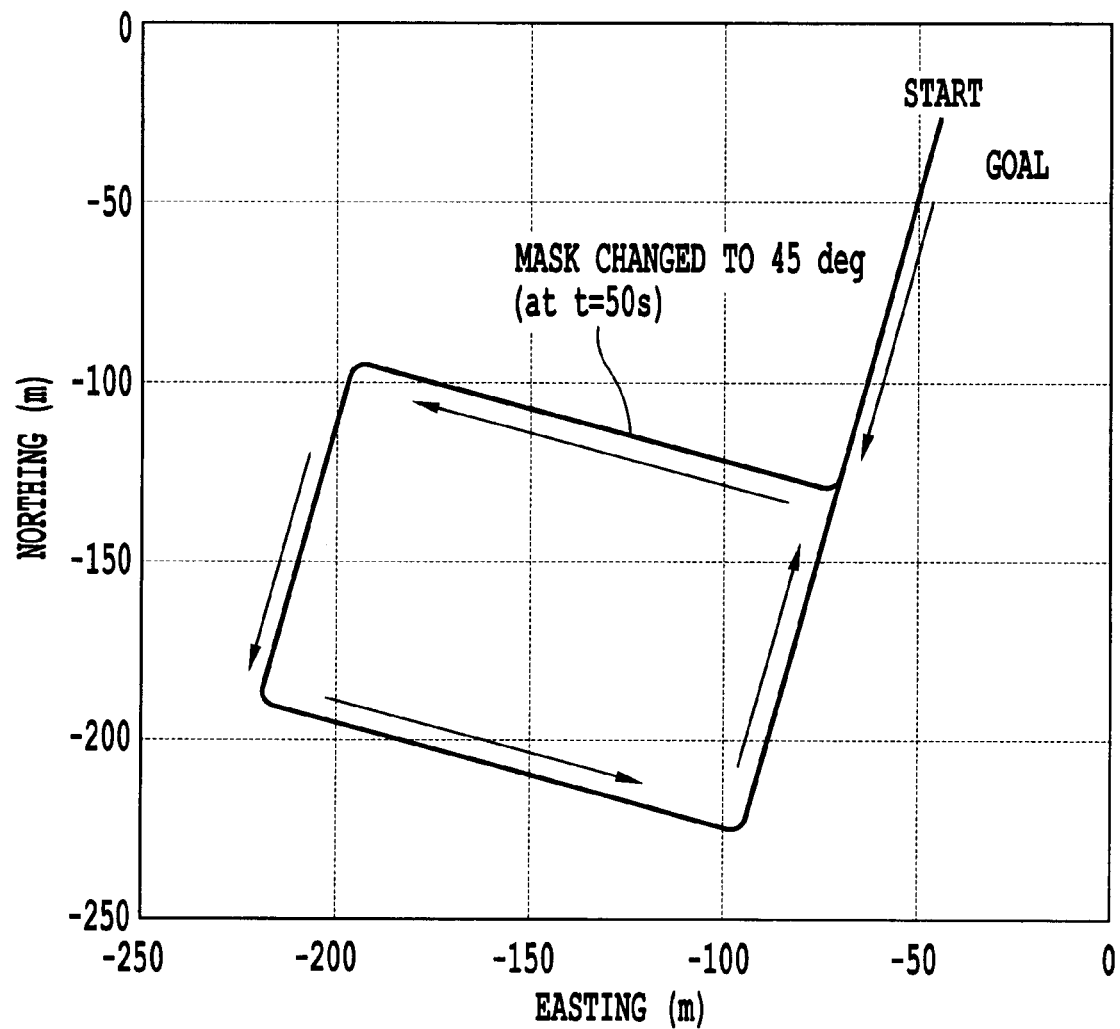
FIG. 5 illustrates a horizontal navigation course used in a simulation.

A design evaluation of embodiments of the navigation system and method of the present invention was performed by numerical simulation. FIG. 4 shows the simulation model including the various error sources. A horizontal path shown in FIG. 5 going through some tall buildings is used in the simulation. The GPS orbits are simulated using the almanac of the GPS week 1278. The nominal satellites masking angle is selected as 10 degrees.

Figure 6:
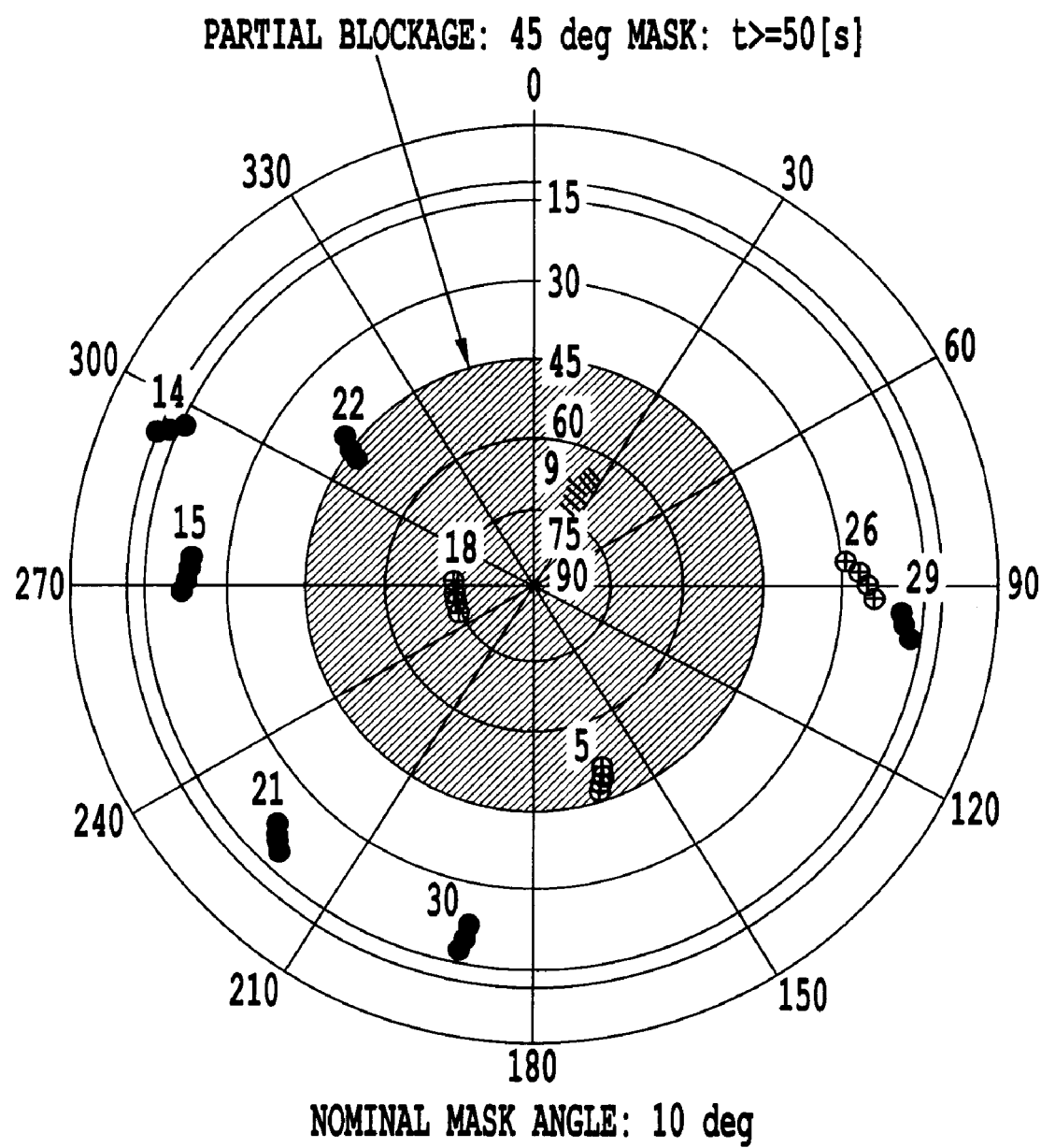
FIG. 6 illustrates a satellite sky plot on Jul. 6, 2004.

A partial GPS satellite outage simulating the blockage by the tall building is considered in the first case. The blockage is represented by the 45 deg mask angle at t=50 s. The sky-plot of the observable satellites is shown in FIG. 6. The number of observed satellites is 10, but only 3 satellites are observed after the blockage. In this case, the conventional RTK-GPS can not output the fixed position. The tightly coupled GPS/DR navigation system here can perform the measurement update by the DD phase and code even if the number of satellite is less than four.

The sensor errors for the simulation are given as, $$\epsilon = 0.2 \text{ deg}, e_v = 5\%; e_g = 5\%; b_g = 0.1 \text{ deg/s}; \quad (31)$$

Figure 7A:
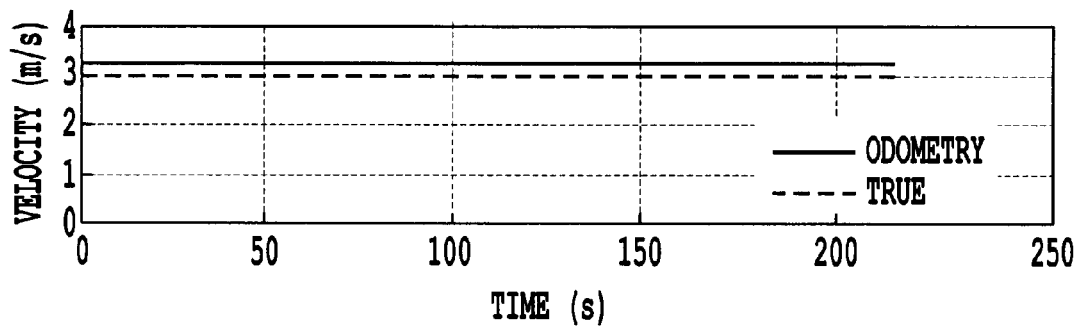
FIG. 7 illustrates the velocity, heading, and yaw rate of a vehicle during simulation.
Figure 7B:
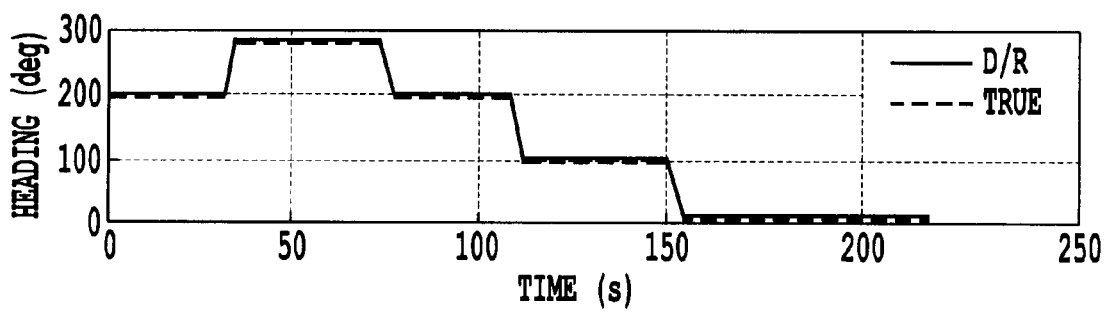
Figure 7C:
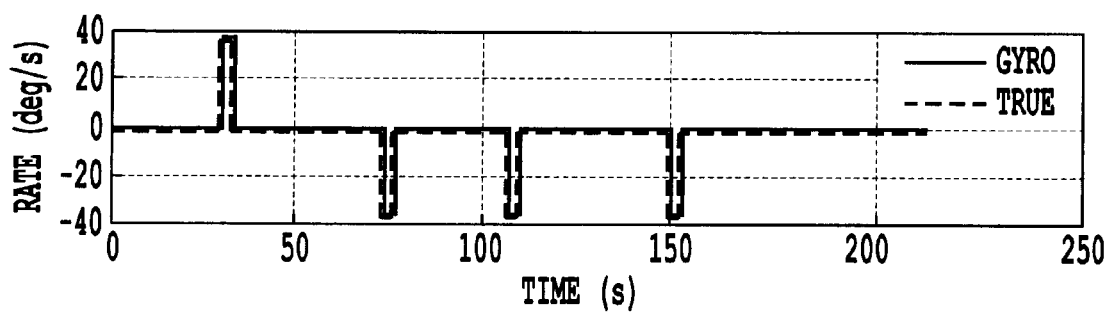
Figure 8A:
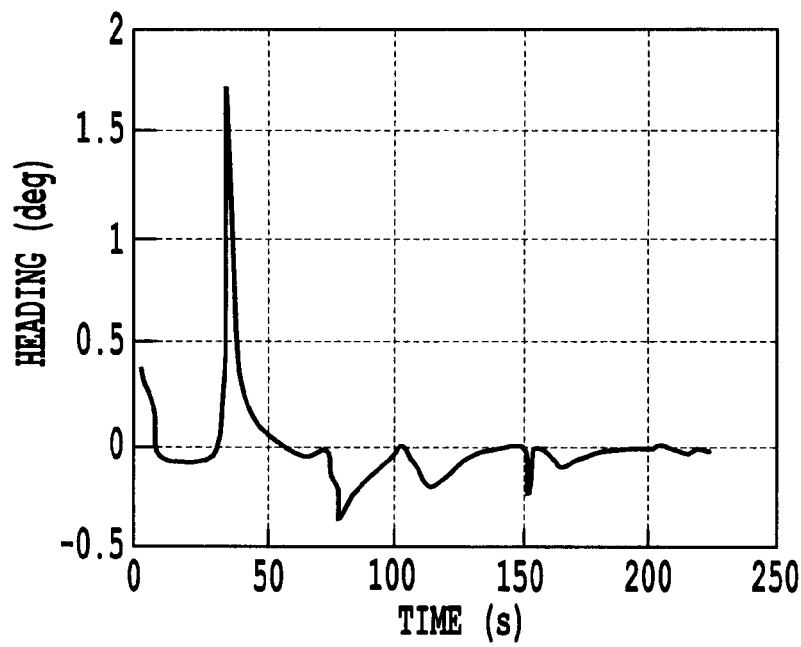
FIG. 8 illustrates the sensor errors estimated by an extended Kalman filter.
Figure 8B:
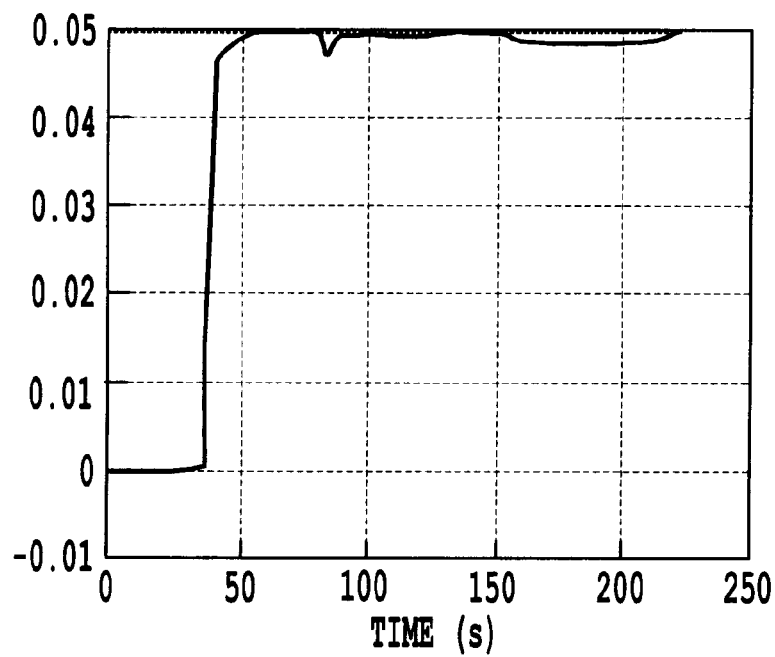
Figure 8C:
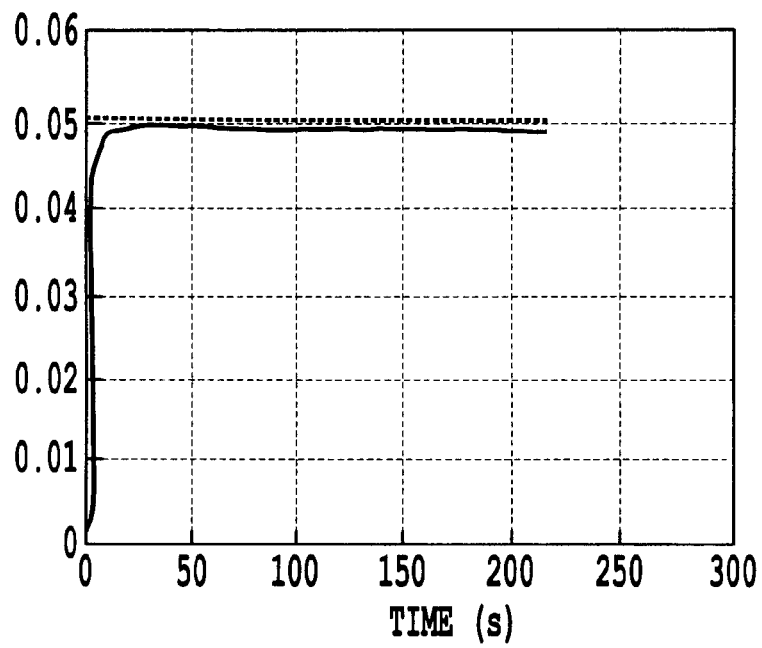
Figure 8D:
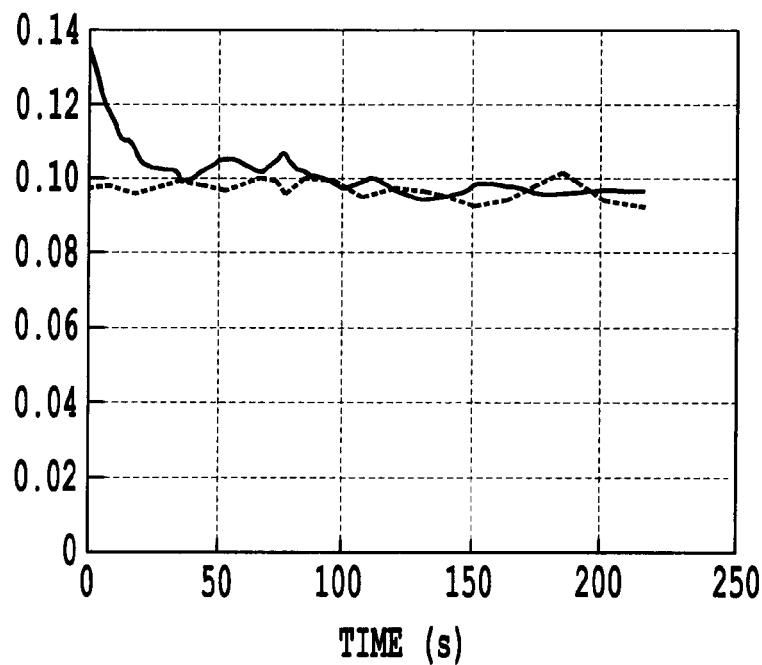
Figure 9A:
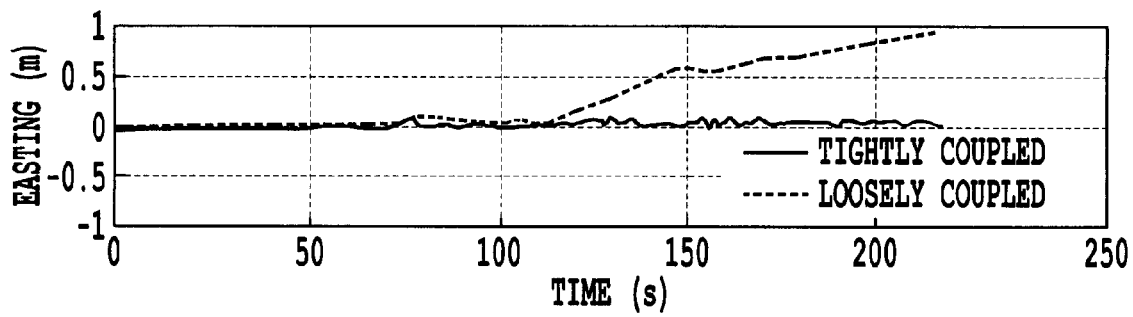
FIG. 9 illustrates the position error estimated by an extended Kalman filter.
Figure 9B:
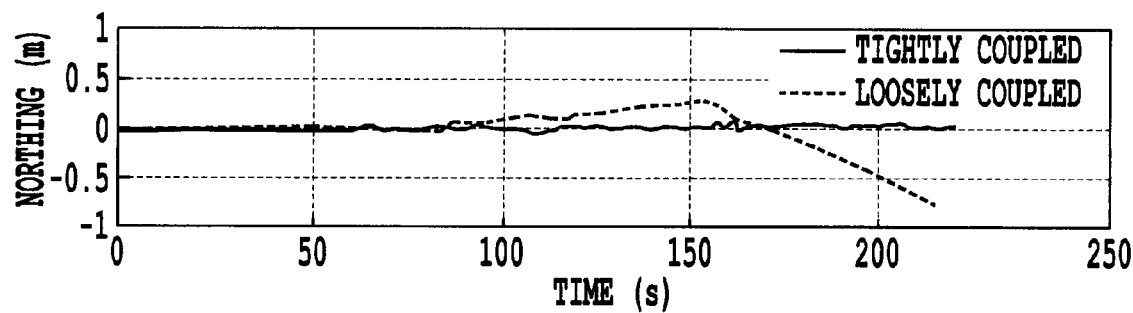
Figure 9C:
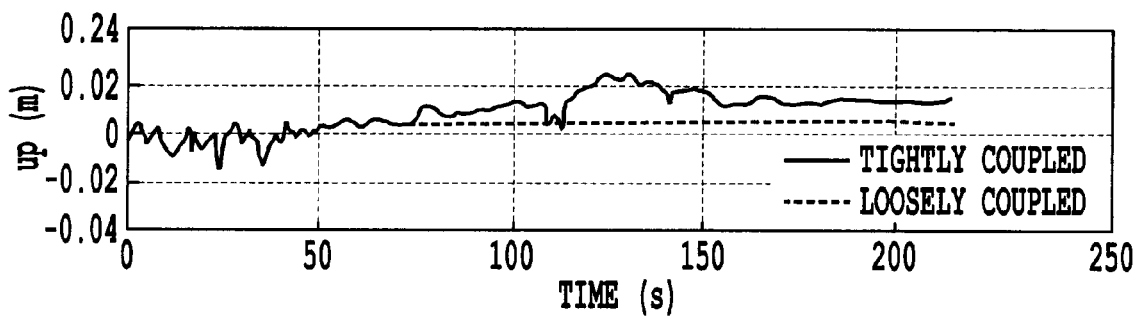
Figure 10:
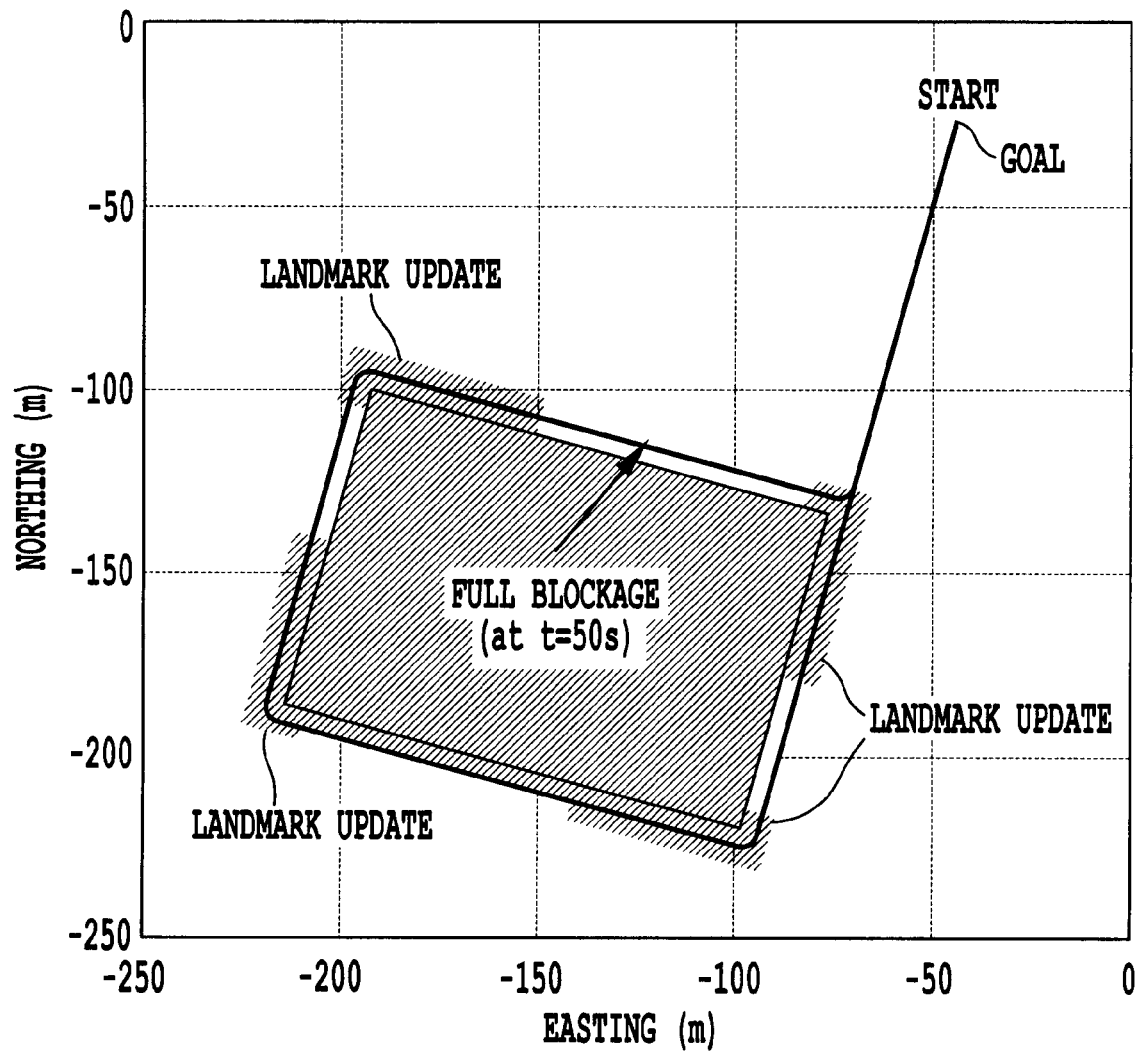
FIG. 10 illustrates a horizontal navigation course used in a simulation with landmark update.
Figure 11A:
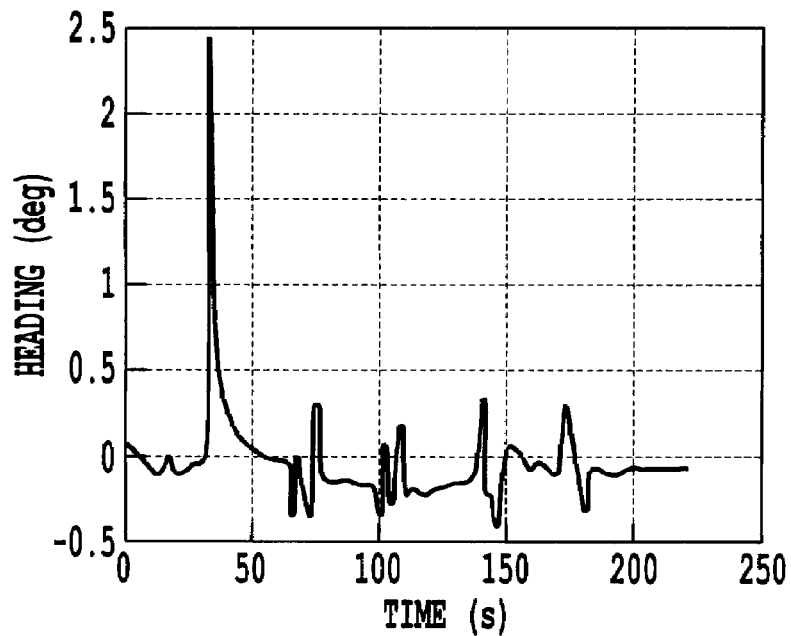
FIG. 11 illustrates the sensor errors estimated by an extended Kalman filter in the case of landmark update.
Figure 11B:
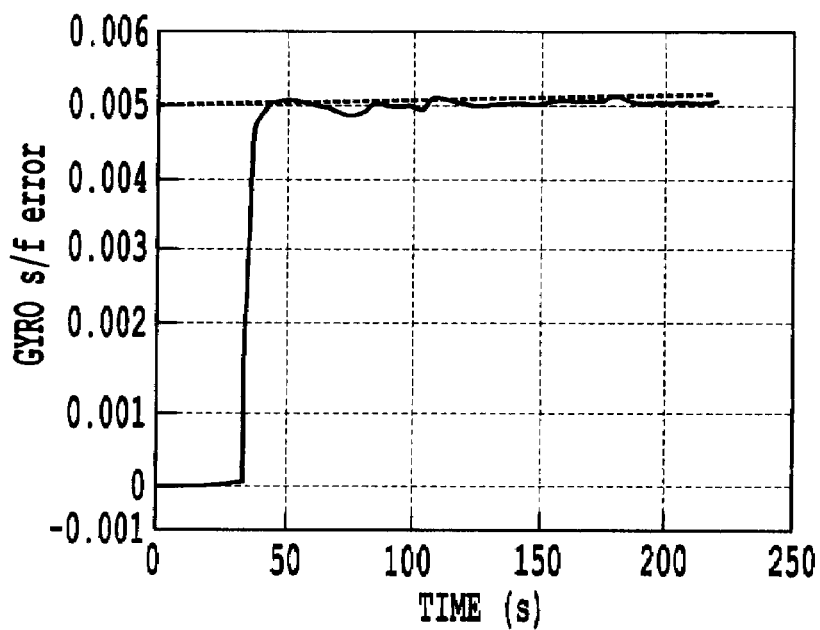
Figure 11C:
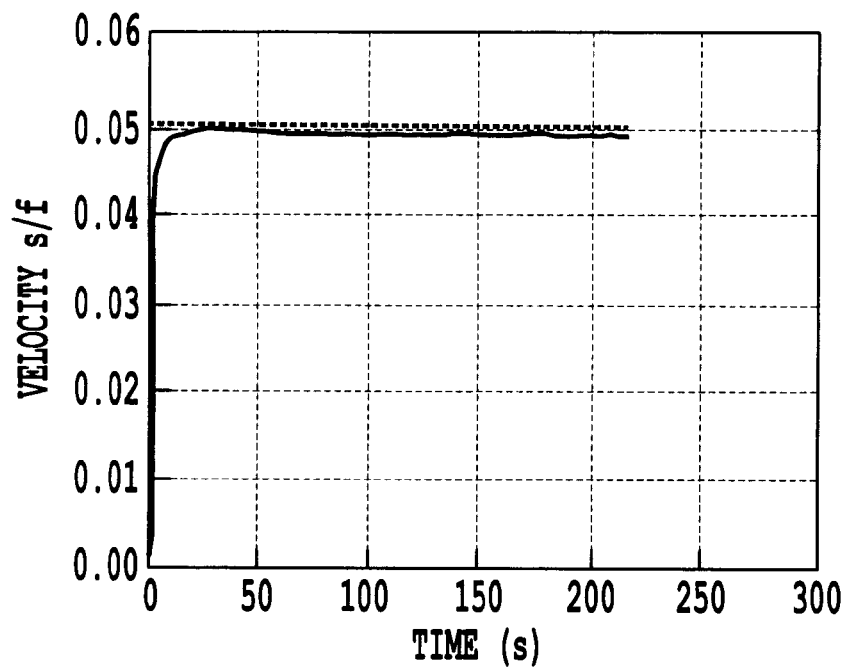
Figure 11D:
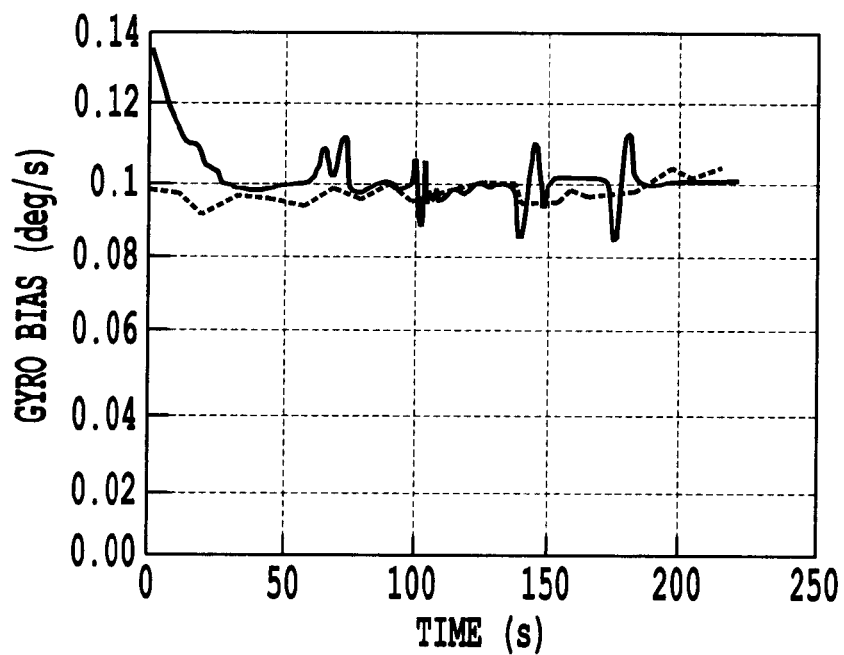
Figure 12A:
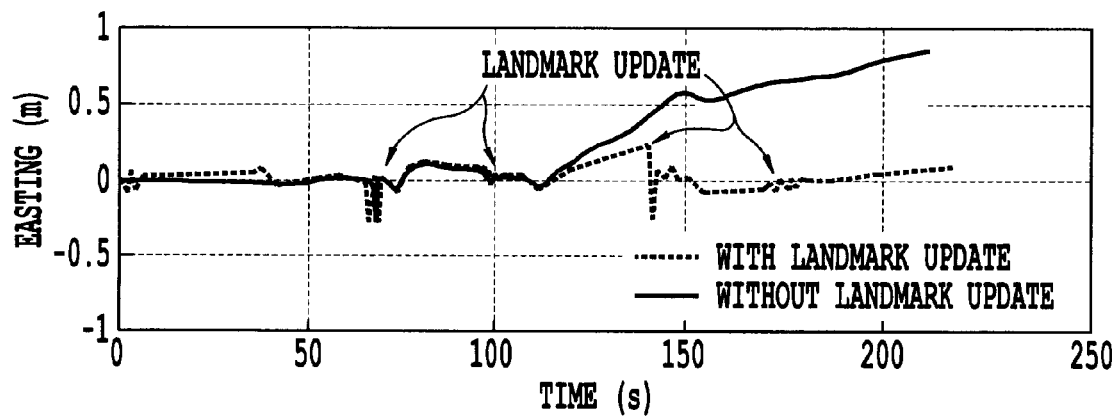
FIG. 12 illustrates the position error estimated by an extended Kalman filter with and without landmark update.
Figure 12B:
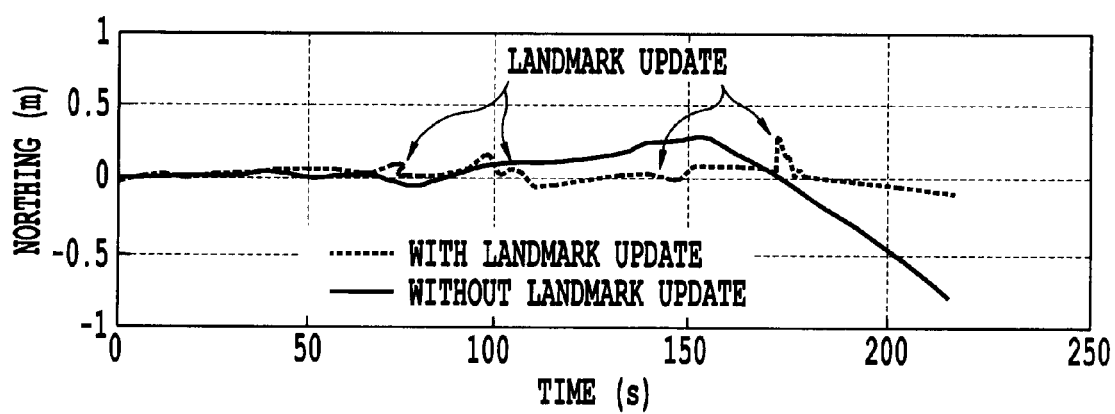

FIG. 7 shows the velocity, heading, and yaw rate of the vehicle for the simulation. The sensor errors estimated by the EKF are shown in FIG. 8. The estimated errors converged to the true value. The error of the position by the EKF is shown in FIG. 9. For comparison, the error of position by the conventional DR navigation system loosely coupled with RTK-GPS is also shown in the same figure. The position error by the tightly coupled system is much smaller than the loosely coupled system. In second case, a full satellite blockage is simulated at t=50 s. In this case, the landmark update is effectively used. The laser scanner is assumed to have the maximum range of 30 m, range accuracy of 4 cm, and angle resolution of 1 deg. The landmark update is performed ahead of the corner landmark if the range is less than 30 m as shown in FIG. 10. FIG. 11 shows the estimated sensor errors by the EKF with landmark measurement update indicated as solid line and the true sensor errors indicated as dash line. The estimated errors converged to the true value. FIG. 12 shows the positioning errors with and without landmark updates. The position error is small even if no GPS measurements are available.

Field Test

Figure 13:
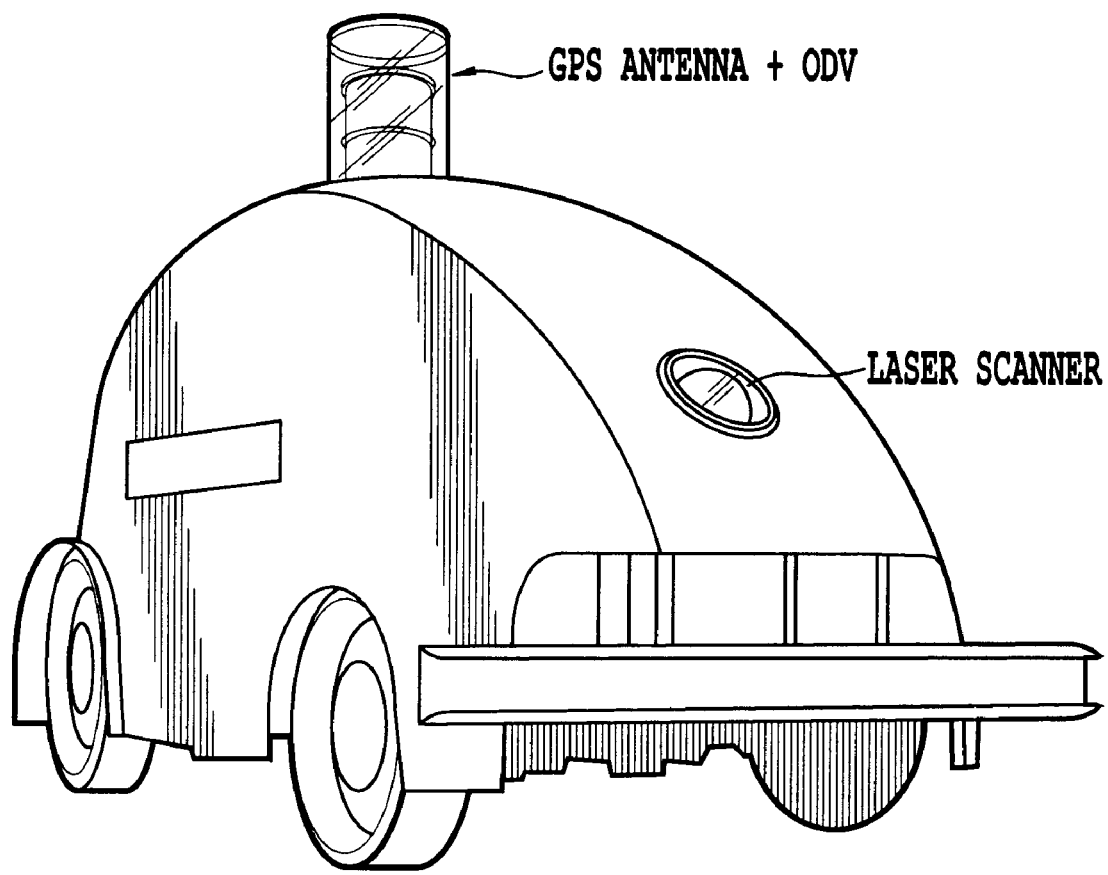
FIG. 13 illustrates an autonomous ground vehicle (AGV)

An autonomous ground vehicle shown in FIG. 13 was employed for field tests. This AGV was developed as a surveillance vehicle that autonomously patrols in a certain area. It is equipped with a laser scanner, SICK LMS291 having 35 mm range accuracy and 1 deg angle resolution; Omni-Directional Video (ODV) camera for surveillance; a dual frequency GPS receiver, Ashtech Z-Xtreme; a FOG having accuracy 1 deg/h; and a high resolution odometer. The real-time guidance and GPS/DR navigation of the vehicle is performed on the onboard RT-Linux computer. The data analysed herein was collected in Kamakura, Japan on Jul. 6, 2004. The dual frequency GPS data observed in the base station of the GEONET [3] at Fujisawa is used for the differential correction. The baseline length is about 5 km. The observed satellites are almost the same as shown in FIG. 6. The ambiguity-fixed position by the RTK-GPS receiver was available only 40% of the time, and 32% of the time had no solution.

Figure 14:
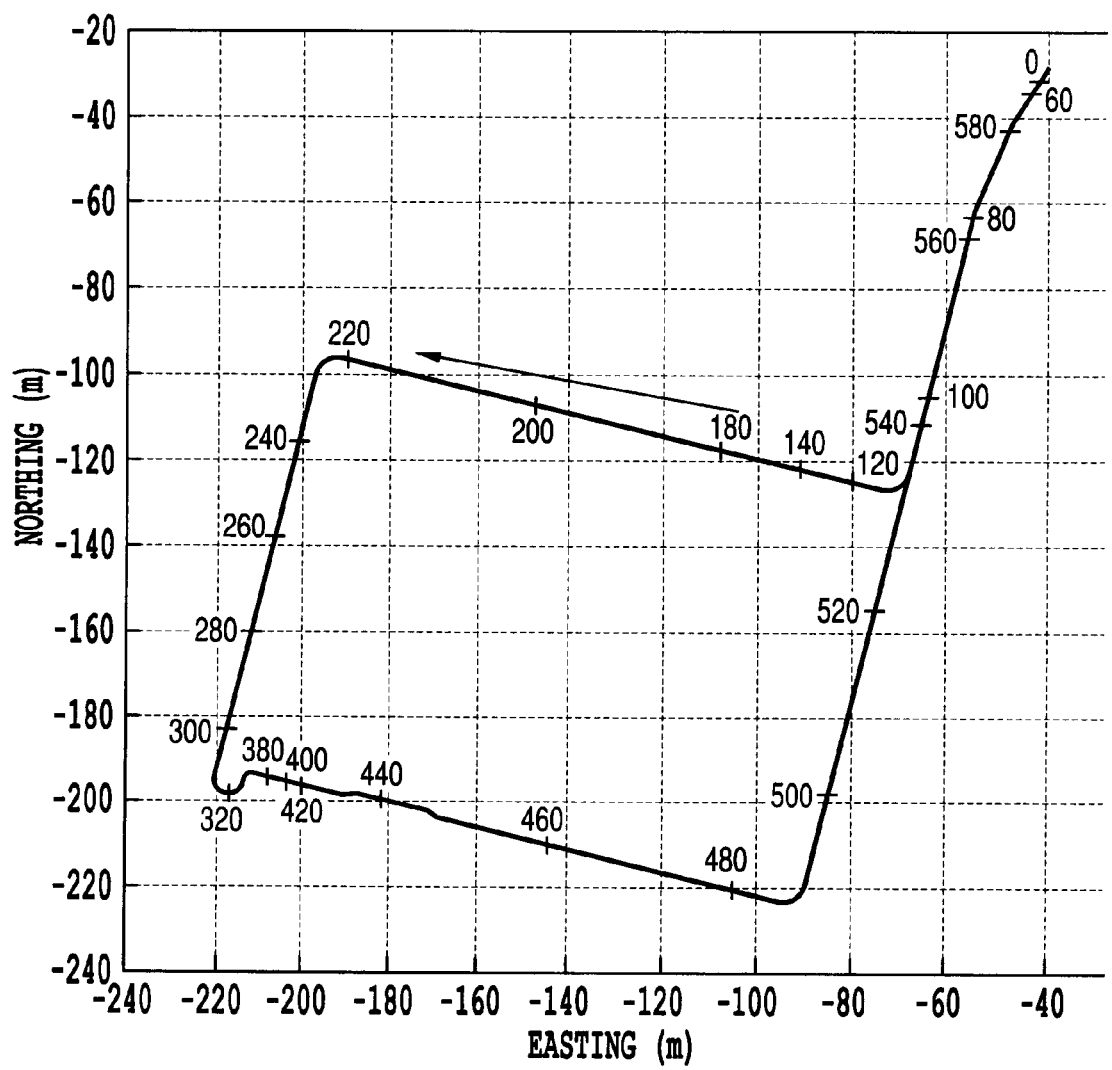
FIG. 14 illustrates the horizontal position estimated by a Kalman filter during the field test.
Figure 15A:
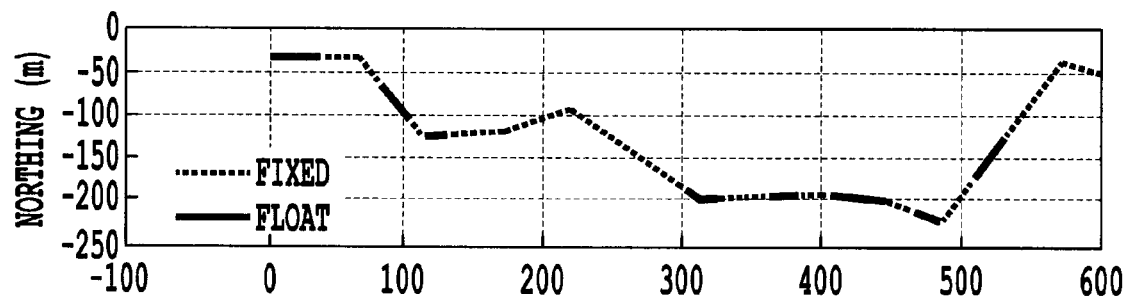
FIG. 15 illustrates the NED position during the field test.
Figure 15B:
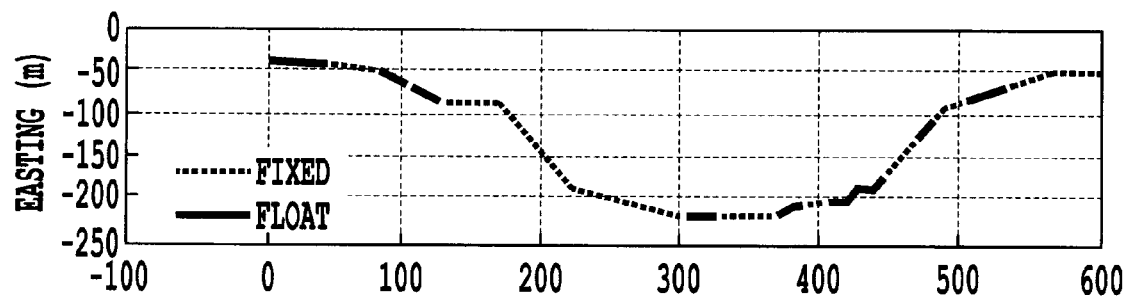
Figure 15C:
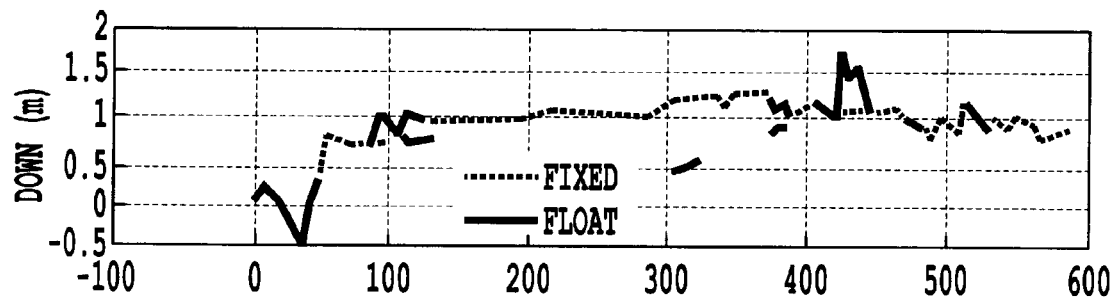
Figure 16A:
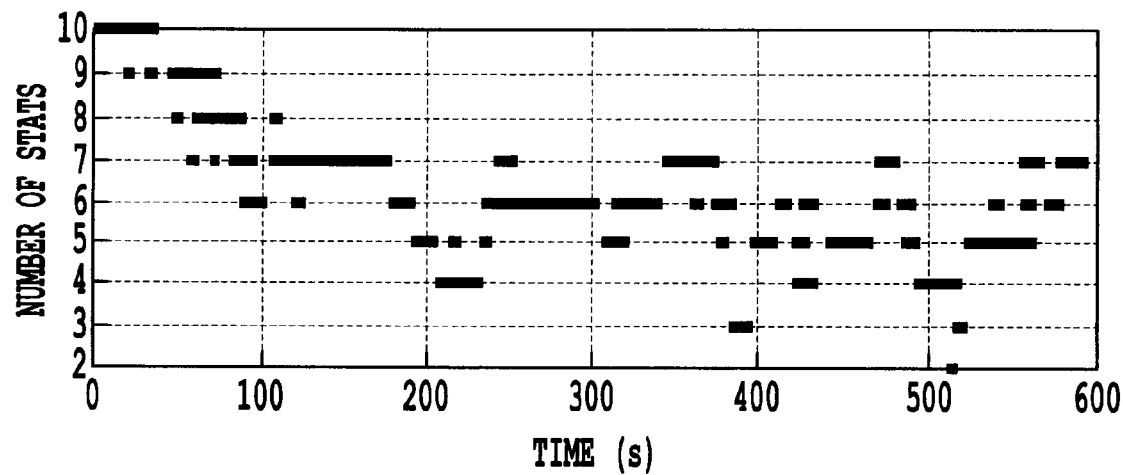
FIG. 16 illustrates the number of satellites and the estimated validity of the integer ambiguity.
Figure 16B:
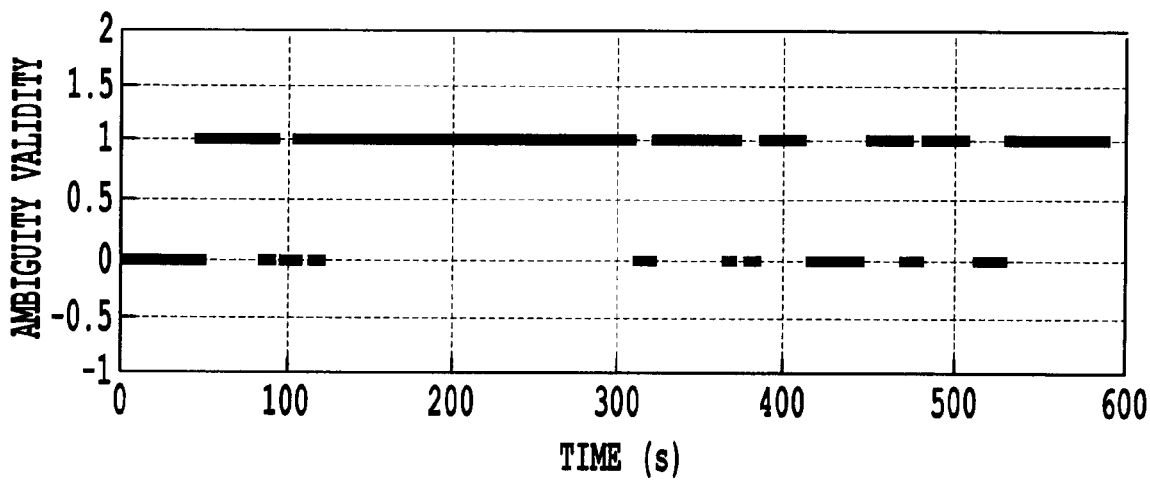

The current onboard real-time implementation is based on the loosely coupled navigation. The tightly coupled navigation solutions were obtained by a post processing calculation. FIG. 14 and FIG. 15 show the calculated position result of the field test. FIG. 16 shows the number of observed satellites and the estimated validity of the integer ambiguity. If the validity is one, the ambiguity is estimated to be fixed. For the tightly coupled navigation system, more than 70% of the position is based on the fixed solution. The centimeter-level accuracy was confirmed by comparing the calculated position by EKF with the fixed solution of RTK-GPS receiver. The position accuracy was confirmed by the residual analysis of DD carrier phase where the fixed solution of RTK-GPS is not available.

Figure 17:
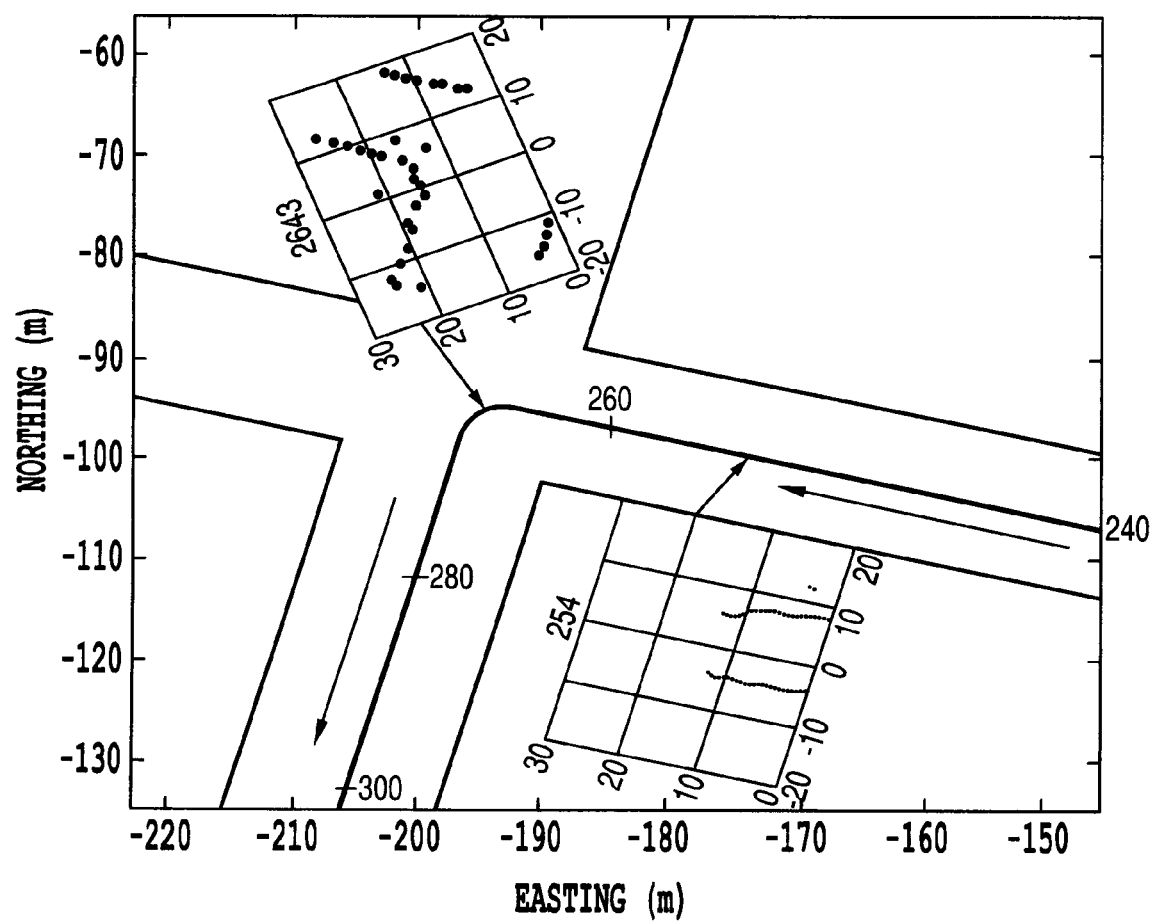
FIG. 17 illustrates the vehicle path and a plot of the measured range of the laser scanner during the field test.

The landmark update is also performed at a second corner of the course. FIG. 17 shows the vehicle path and the plot of laser-scanner range at t=254 s and t=264.3 s. The plot of laser-scanner range is rotated by the heading of the vehicle to be matched with the path direction. This figure shows that the corner can be detectable with the range measurement by the laser-scanner.

Figure 18A:
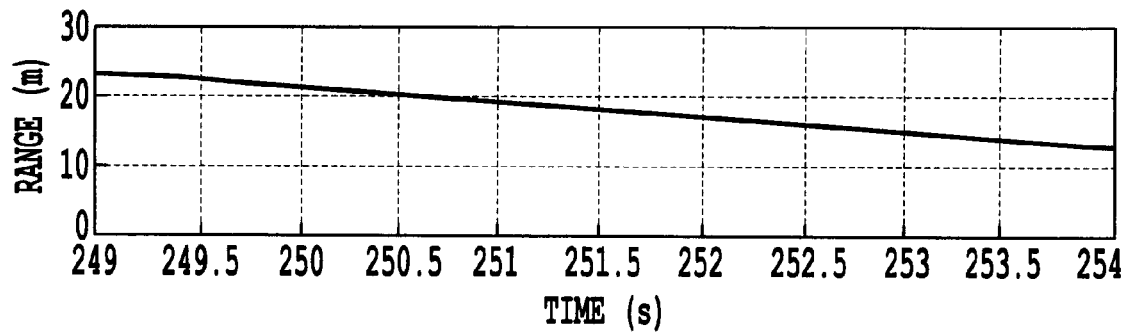
FIG. 18 illustrates the measurement data for the landmark update during the field test.
Figure 18B:
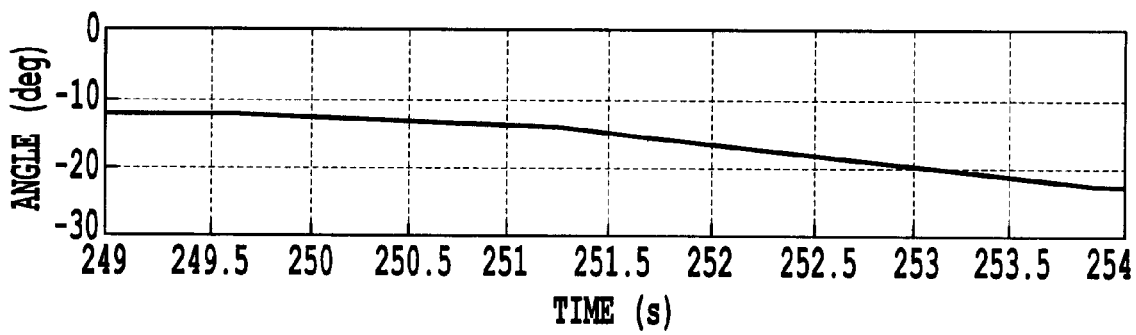
Figure 18C:
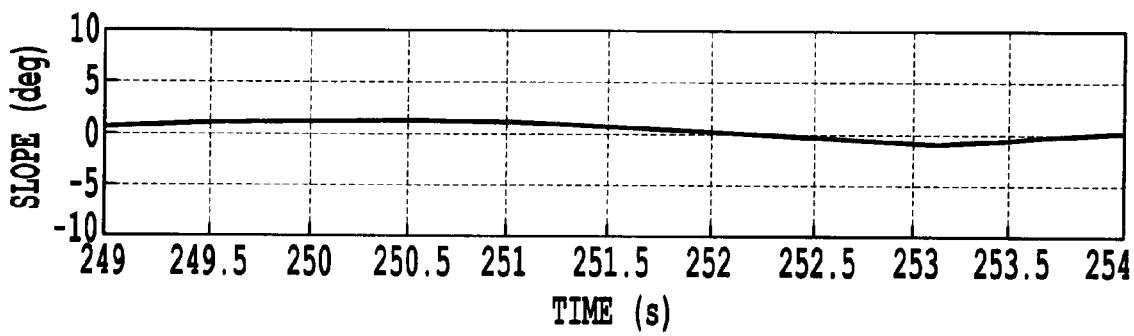

FIG. 18 shows the examples of measured data by the laser-scanner at the second corner including the measured relative range and angle for the corner landmark, the measured slope for the line landmark.

Figure 19:
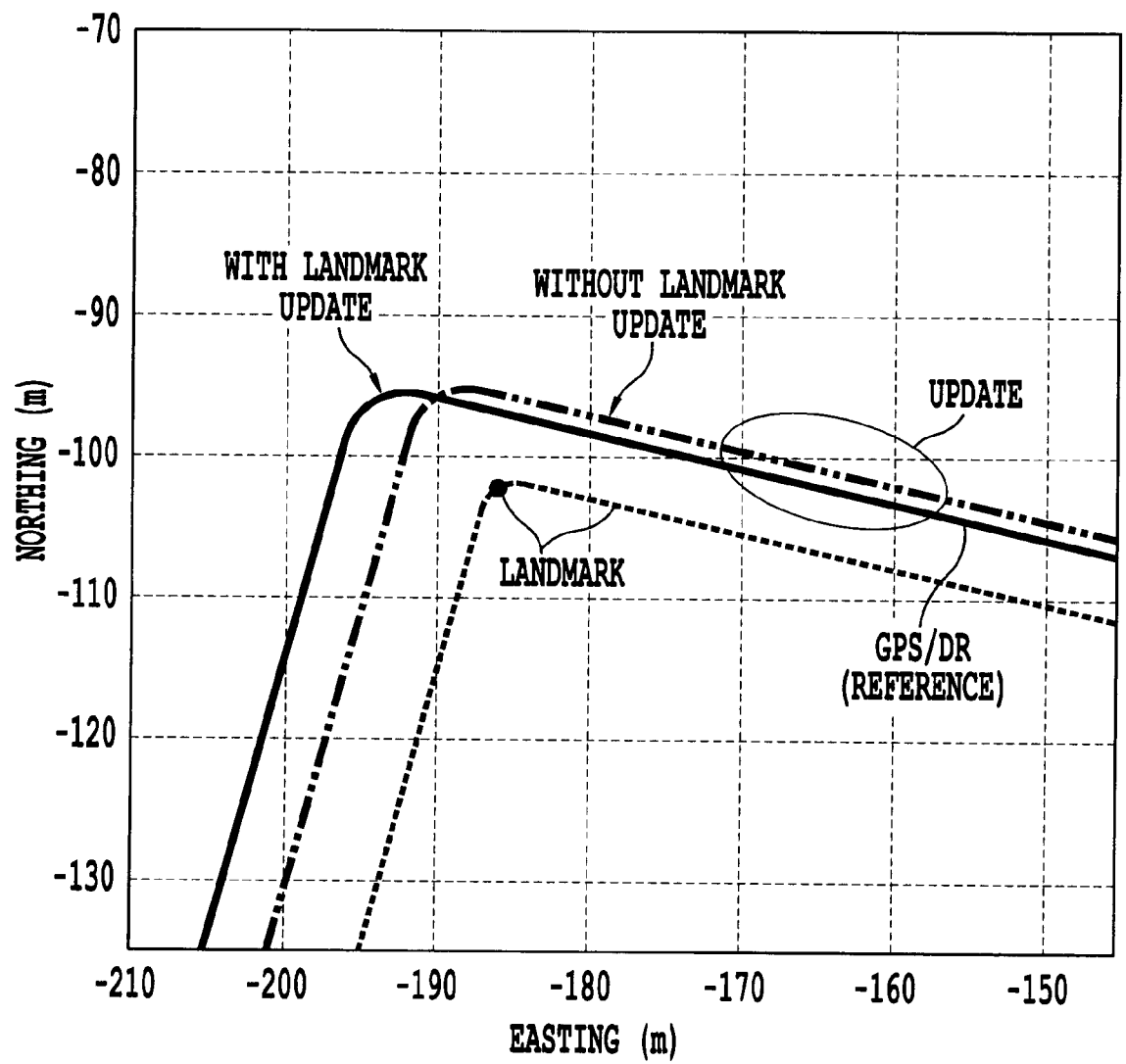
FIG. 19 illustrates the calculated position update with and without the landmark update during the field test.

The landmark update is performed without GPS measurement update because GPS/DR position shown in FIG. 14 already has high position accuracy. FIG. 19 shows the calculated position result with the landmark update. For comparison, the result without landmark update and GPS/DR position is also shown in the same figure. The calculated position result is nearly same as the GPS/DR position. With the corner and line landmark update, the position accuracy is improved when no GPS measurements are available.

A horizontal navigation system aided by a carrier phase DGPS and a Laser-Scanner for an AGV is designed and the performance is confirmed by numerical simulations and field tests. An embodiment of the present invention shows that decimeter-level positioning accuracy is achievable under poor satellite visibility by the proposed tightly coupled navigation system using carrier phase DGPS and LS augmentation.

The invention claimed is:

1. A navigational method of determining a position and heading of an object, comprising:
    calculating the position and the heading of the object based on an output of a velocity detecting device and an output of a yaw rate detecting device;
    estimating, based on a carrier phase and a pseudorange received from a global positioning satellite, (1) an error of the velocity detecting device, (2) an error of the yaw rate detecting device, (3) a position error and a heading error of the object, and (4) an integer-valued bias of a carrier, wherein the estimating step includes
        estimating a relative range and/or a relative angle between a known landmark and the object based on an angle measured by an angle measuring device provided on the object and stored position data of the known landmark; and
        calculating an observation error based on the estimated relative range; and
    updating the position and the heading of the object based on the estimated position error and the estimated heading error.

2. The method of claim 1, wherein the estimating step comprises:
    estimating the relative range based on geometrical data of at least two known landmarks and a known yaw angle of the angle measuring device.

3. The method of claim 1, wherein the estimating step comprises:
    estimating the relative range based on the angle measured by a laser scanner.

4. The method of claim 1, wherein the calculating step comprises: calculating the position and the heading of the object using the dynamical equations:

$$\frac{d\phi}{dt} = r; \frac{dN}{dt} = V\cos\phi - br\sin\phi;$$
$$\frac{dE}{dt} = V\sin\phi + br\cos\phi; \frac{dD}{dt} = 0,$$

wherein N, E, and D are components of the position, $\Phi$ is the heading, V is a velocity measured by the velocity detecting device, r is a yaw rate measured by the yaw rate detecting device, t is time, and b is a predetermined distance.

5. The method of claim 1, wherein the estimating step comprises:
    estimating a float ambiguity vector of double-differenced carrier phase using an extended Kalman filter; and
    resolving ambiguity in the integer-valued bias of the carrier, using a Lambda method, based on the estimated float ambiguity vector of double-differenced carrier phase estimated by the extended Kalman filter.

6. The method of claim 1, wherein the calculating step comprises:
    calculating the position and the heading of the object based on outputs of an odometer and a rate gyro.

7. The method of claim 1, wherein the landmark is one of a traffic sign, a curbstone, and a white line.

8. The method of claim 1, wherein the angle measuring device is an image sensor.

9. A navigational system for determining a position and heading of an object comprising:
    a navigation calculation device configured to calculate the position and the heading of the object based on an output of a velocity detecting device and an output of a yaw rate detecting device; and
    an estimator configured to estimate, based on a carrier phase and a pseudorange received from a global positioning satellite, (1) an error of the velocity detecting device, (2) an error of the yaw rate detecting device, (3) a position error and a heading error of the object, and (4) an integer-valued bias of a carrier, wherein the estimator is configured to estimate a relative range and/or a relative angle between a known landmark and the object based on an angle measured by an angle measuring device provided on the object and stored position data of the known landmark,
    wherein the navigation calculation device is configured to update the position and the heading of the object based on the position error and the heading error estimated by the estimator.

10. The navigational system of claim 9, wherein the estimator is configured to calculate an observation error based on the estimated relative range.

11. The navigational system of claim 9, wherein the estimator is configured to estimate the relative range based on geometrical data of at least two known landmarks and a known yaw angle of the angle measuring device.

12. The navigational system of claim 9, wherein the navigation calculation device is configured to calculate the position and the heading of the vehicle using the dynamical equations:

$$\frac{d\phi}{dt} = r; \frac{dN}{dt} = V\cos\phi - br\sin\phi;$$
$$\frac{dE}{dt} = V\sin\phi + br\cos\phi; \frac{dD}{dt} = 0,$$

wherein N, E, and D are components of the position, $\phi$ is the heading, V is a velocity measured by the velocity detecting device, r is a yaw rate measured by the yaw rate detecting device, t is time, and b is a predetermined distance.

13. The navigational system of claim 9, wherein the estimator comprises:
    an extended Kalman filter configured to estimate a float ambiguity vector of double-differenced carrier phase; and
    an ambiguity resolution device configured to resolve ambiguity in the integer-valued bias of the carrier, using a Lambda method, based on the float ambiguity vector of double-differenced carrier phase estimated by the extended Kalman filter.

14. The navigational system of claim 9, wherein the estimator is configured to estimate the relative range between one of a traffic sign, a curbstone, and a white line, and the vehicle.

15. The navigational system of claim 9, wherein the angle measuring device is an image sensor.

16. A vehicle, comprising:
    a propulsion system configured to propel the vehicle; and
    a navigational system for determining a position and heading of the vehicle using inertial and satellite navigation, the navigational system including:
        a velocity detecting device configured to detect a velocity of the vehicle;

a yaw rate detecting device configured to detect a yaw rate of the vehicle;

a landmark database configured to store position data of a known landmark;

a navigation calculation device configured to calculate the position and the heading of the vehicle based on the velocity detected by the velocity detecting device and the yaw rate detected by the yaw rate detecting device; and an estimator configured to estimate, based on a carrier phase and a pseudorange received from a global positioning satellite, (1) an error of the velocity detecting device, (2) an error of the yaw rate detecting device, (3) a position error and a heading error of the vehicle, and (4) an integer-valued bias of a carrier, wherein the estimator is configured to estimate a relative range and/or a relative angle between the known landmark and the vehicle based on the measured angle and the stored position data of the known landmark, wherein the navigation calculation device is configured to update the position and the heading of the vehicle based on the position error and the heading error estimated by the estimator.

* * * * *